US012807516B2

(12) United States Patent
Borra

(10) Patent No.: US 12,807,516 B2
(45) Date of Patent: Nov. 24, 2026

(54) EVENT LOCALIZATION IN A WATER DISTRIBUTION SYSTEM

(71) Applicant: McWane, Inc., Birmingham, AL (US)

(72) Inventor: Sneha Borra, Frisco, TX (US)

(73) Assignee: MCWANE, LLC, Birmingham, AL (US)

( * ) Notice: Subject to any disclaimer, the term of this patent is extended or adjusted under 35 U.S.C. 154(b) by 399 days.

(21) Appl. No.: 18/412,109

(22) Filed: Jan. 12, 2024

(65) Prior Publication Data

US 2026/0116783 A1 Apr. 30, 2026

(51) Int. Cl.
*C02F 1/00* (2023.01)

(52) U.S. Cl.
CPC .............. *C02F 1/008* (2013.01); *C02F 1/006* (2013.01); *C02F 2209/03* (2013.01); *C02F 2301/06* (2013.01)

(58) Field of Classification Search
CPC ...... C02F 1/008; C02F 1/006; C02F 2209/03; C02F 2301/06
See application file for complete search history.

(56) References Cited

U.S. PATENT DOCUMENTS

| | | | |
|---|---|---|---|
| 3,585,973 | A | 6/1971 | Klover |
| 3,719,090 | A | 3/1973 | Hathaway |
| 3,980,097 | A | 9/1976 | Ellis |
| 4,055,844 | A | 10/1977 | Hornbostel, Jr. |

(Continued)

FOREIGN PATENT DOCUMENTS

| | | | |
|---|---|---|---|
| AU | 2011274272 | A1 | 2/2013 |
| CA | 2517744 | A1 | 3/2006 |

(Continued)

OTHER PUBLICATIONS

International Preliminary Report on Patentability received for International Patent Application No. PCT/US2020/049388, mailed on Mar. 17, 2022, 08 pages.

(Continued)

*Primary Examiner* — An H Do
(74) *Attorney, Agent, or Firm* — Brian Sattizahn; Maynard Nexsen PC

(57) ABSTRACT

An event localization system for a water distribution system can identify disturbance events in the water distribution system and determine the progression of the disturbance event through the water distribution system. The event localization system can use a hydraulic model of the water distribution system to generate information regarding how a disturbance event may propagate or travel through the water distribution system. The event localization system can receive data regarding disturbance events from several sensors located throughout the water distribution system. Once the event localization system receives the disturbance event data from the sensors, the event localization system can use the disturbance event data and the information regarding how a disturbance event may propagate through the water distribution system to determine the source of the disturbance event and the time sequence of how the disturbance event propagated through the water distribution system. The event localization system can then provide a mapping of the source and time sequence of the disturbance event for a user.

20 Claims, 14 Drawing Sheets

(56) References Cited

U.S. PATENT DOCUMENTS 4,177,826 A 12/1979 Luckenbill
4,227,544 A 10/1980 Luckenbill
4,435,974 A 3/1984 Fuchs et al.
4,608,857 A 9/1986 Mertens et al.
5,441,074 A 8/1995 Kjaer
6,058,957 A 5/2000 Honigsbaum
6,442,999 B1 9/2002 Baumoel
6,624,628 B1 9/2003 Kwun et al.
6,751,560 B1 6/2004 Tingley et al.
6,782,751 B2 8/2004 Linares et al.
6,820,635 B1 11/2004 Mckeague
6,848,313 B2 2/2005 Krieg et al.
6,931,445 B2 8/2005 Davis
6,935,367 B2 8/2005 Cook et al.
6,957,157 B2 10/2005 Lander
7,111,817 B2 9/2006 Teti et al.
7,171,854 B2 2/2007 Nagashima et al.
7,228,726 B2 6/2007 Kates
7,231,331 B2 6/2007 Davis
7,266,992 B2 9/2007 Shamout et al.
7,274,996 B2 9/2007 Lapinski et al.
7,418,354 B1 8/2008 Greenlee et al.
7,475,596 B2 1/2009 Hunaidi et al.
7,596,458 B2 9/2009 Lander
7,607,351 B2 10/2009 Allison et al.
7,665,348 B2 2/2010 Giles
7,668,670 B2 2/2010 Lander
7,680,625 B2 3/2010 Trowbridge et al.
7,711,217 B2 5/2010 Takahashi et al.
7,740,024 B2 6/2010 Brodeur et al.
7,746,246 B2 6/2010 Salser, Jr.
7,810,378 B2 10/2010 Hunaidi et al.
7,837,063 B2 11/2010 Stoddard
7,980,317 B1 7/2011 Preta et al.
7,983,869 B1 7/2011 Hurley
8,109,131 B2 2/2012 Winter
8,291,990 B1 10/2012 Mohr
8,362,919 B2 1/2013 Cooper et al.
8,401,811 B1 3/2013 Hurley
8,589,092 B2 11/2013 Plouffe et al.
8,620,602 B2 12/2013 Alonso
8,640,728 B2 2/2014 Sigelakis
8,657,021 B1 2/2014 Preta et al.
8,701,700 B2 4/2014 Penner et al.
8,701,709 B2 4/2014 Athanasiades et al.
8,805,633 B1 8/2014 Hurley
8,931,505 B2 1/2015 Hyland et al.
8,942,947 B1 1/2015 Hurley
8,997,777 B2 4/2015 Montague
9,021,868 B2 5/2015 Sakamoto et al.
9,467,754 B1 10/2016 Sparks et al.
9,506,785 B2 11/2016 Turk
9,596,293 B2 3/2017 Hirano
9,670,650 B2 6/2017 Pinney et al.
9,700,746 B2 7/2017 Bodemann
9,835,592 B2 12/2017 Yusuf et al.
9,939,344 B2 4/2018 Bracken et al.
9,983,092 B2 5/2018 Howitt
10,072,398 B2 9/2018 Magill et al.
10,317,384 B2 6/2019 Morrow et al.
10,415,714 B1 9/2019 Kennedy
10,879,624 B2 12/2020 Yoshikawa et al.
10,921,304 B2 2/2021 Morrow et al.
11,054,057 B2 7/2021 Dolenti
11,186,971 B1 11/2021 Allen et al.
11,371,977 B2 6/2022 Morrow et al.
11,391,712 B2 7/2022 Morrow et al.
11,460,459 B2 10/2022 Morrow et al.
12,072,327 B2* 8/2024 Morrow ................ H04W 4/021
2002/0023220 A1 2/2002 Kaplan
2002/0124533 A1 9/2002 Schmetzer et al.
2002/0124633 A1 9/2002 Yang et al.
2002/0144731 A1 10/2002 Heil
2004/0112431 A1 6/2004 Burlock et al.
2005/0067015 A1 3/2005 Mckeague
2005/0076965 A1 4/2005 Buckner et al.
2006/0016479 A1 1/2006 Gonzales
2007/0120664 A1 5/2007 Bilbrey et al.
2007/0120884 A1 5/2007 Lecheheb
2007/0163334 A1 7/2007 Boyd
2007/0256842 A1 11/2007 Mohr
2008/0052094 A1 2/2008 Morfopoulos et al.
2008/0189056 A1 8/2008 Heidl et al.
2008/0245420 A1 10/2008 Davidson et al.
2008/0281534 A1 11/2008 Hurley
2008/0289402 A1 11/2008 Chowdhury
2009/0066524 A1 3/2009 Yukawa et al.
2009/0157521 A1 6/2009 Moren et al.
2009/0269140 A1 10/2009 Hater et al.
2009/0320933 A1 12/2009 Davidson et al.
2010/0006654 A1 1/2010 Poel
2010/0065287 A1 3/2010 Burkhart et al.
2010/0066547 A1 3/2010 Chowdhury
2010/0126590 A1 5/2010 Walworth
2010/0126601 A1 5/2010 Heron et al.
2010/0189887 A1 7/2010 Nielsen et al.
2010/0295672 A1 11/2010 Hyland et al.
2010/0307609 A1 12/2010 Burt et al.
2010/0310385 A1 12/2010 Denne
2011/0094758 A1 4/2011 Burkhart et al.
2011/0247416 A1 10/2011 Cooper et al.
2011/0308638 A1 12/2011 Hyland et al.
2012/0004866 A1 1/2012 Plouffe et al.
2012/0007743 A1 1/2012 Solomon
2012/0007744 A1 1/2012 Pal et al.
2012/0160329 A1 6/2012 Mackenzie et al.
2012/0244403 A1 9/2012 Maskew et al.
2012/0305084 A1 12/2012 Ball et al.
2013/0048318 A1 2/2013 Ewers et al.
2013/0054121 A1 2/2013 Casoni et al.
2013/0138396 A1 5/2013 Hauffen et al.
2013/0192350 A1 8/2013 Fleury et al.
2013/0199625 A1 8/2013 Fleury, Jr. et al.
2013/0206241 A1 8/2013 Fleury, Jr. et al.
2013/0314239 A1 11/2013 Clark et al.
2014/0131463 A1 5/2014 Mccune et al.
2014/0150554 A1 6/2014 Rada et al.
2014/0165731 A1 6/2014 Linford
2014/0207389 A1* 7/2014 Hayner ............... G01M 5/0025
702/33
2014/0224026 A1 8/2014 Linford et al.
2014/0311587 A1 10/2014 Ellis
2014/0338464 A1 11/2014 Ball et al.
2014/0340238 A1 11/2014 Hyland et al.
2015/0082868 A1 3/2015 Hyland et al.
2015/0241402 A1 8/2015 Dooley et al.
2015/0376876 A1 12/2015 Kennedy
2015/0377020 A1 12/2015 Kronenberger et al.
2016/0093193 A1 3/2016 Silvers et al.
2016/0097746 A1 4/2016 Traub
2016/0101307 A1 4/2016 Montague
2016/0229703 A1* 8/2016 Nolan ..................... C02F 1/325
2016/0230373 A1 8/2016 Sliger et al.
2016/0356755 A1 12/2016 Gifford et al.
2017/0082592 A1 3/2017 Morrow et al.
2017/0130431 A1 5/2017 Pinney et al.
2017/0216645 A1 8/2017 Silvers et al.
2017/0234712 A1 8/2017 Ball et al.
2017/0291141 A1 10/2017 Dunham et al.
2017/0350544 A1 12/2017 Sutton et al.
2018/0093117 A1 4/2018 Hyland et al.
2018/0320828 A1 11/2018 Lander et al.
2019/0128335 A1 5/2019 Li et al.
2019/0285604 A1 9/2019 Morrow et al.
2019/0316983 A1 10/2019 Fleury, Jr. et al.
2020/0088706 A1 3/2020 Morrow et al.
2020/0400643 A1 12/2020 Morrow et al.
2021/0140151 A1 5/2021 Johnson et al.
2022/0003738 A1 1/2022 Morrow et al.
2022/0003739 A1 1/2022 Morrow et al.

(56) References Cited

U.S. PATENT DOCUMENTS

| | | | |
|---|---|---|---|
| 2023/0014958 | A1 | 1/2023 | Morrow et al. |
| 2023/0062462 | A1 | 3/2023 | Morrow et al. |

FOREIGN PATENT DOCUMENTS

| | | | |
|---|---|---|---|
| CA | 2592125 | A1 | 12/2007 |
| CA | 2801242 | A1 | 1/2012 |
| CA | 2801242 | C | 5/2014 |
| CA | 3002309 | C | 9/2020 |
| CA | 3149224 | A1 | 3/2021 |
| CN | 202740674 | U | 2/2013 |
| CN | 103244828 | A | 8/2013 |
| CN | 203750085 | U | 8/2014 |
| CN | 104368112 | A | 2/2015 |
| CN | 204781115 | U | 11/2015 |
| CN | 205084293 | U | 3/2016 |
| CN | 205088745 | U | 3/2016 |
| CN | 205978525 | U | 2/2017 |
| CN | 208823861 | U | 5/2019 |
| EP | 2735783 | A1 | 5/2014 |
| JP | 2012-011115 | A | 1/2012 |
| KR | 101556590 | B1 | 10/2015 |
| WO | 2012/000088 | A1 | 1/2012 |
| WO | 2014/189901 | A1 | 11/2014 |
| WO | 2017/053396 | A1 | 3/2017 |
| WO | 2017/175135 | A1 | 10/2017 |
| WO | 2017/175136 | A1 | 10/2017 |
| WO | 2021/046340 | A1 | 3/2021 |

OTHER PUBLICATIONS

International Search Report and Written Opinion received for International Patent Application No. PCT/US2016/052840, mailed on Dec. 8, 2016, 08 Pages.

Office Action received for Canadian Patent Application No. 2999489, mailed on Apr. 9, 2019, 3 Pages.

Office Action received for Canadian Patent Application No. 2999489, mailed on Feb. 28, 2020, 4 Pages.

International Search Report and Written Opinion received for International Patent Application No. PCT/US2020/049388, mailed on Dec. 8, 2020, 09 Pages.

International Preliminary Report on Patentability received for International Patent Application No. PCT/US2016/052840, mailed on Apr. 5, 2018, 7 pages.

Hampson et al., "Transient Source Localization Methodology and Laboratory Validation", Procedia Engineering, 12th International Conference on Computing and Control for the Water Industry, CCWI2013, vol. 70, Jan. 1, 2014, pp. 781-790.

Pagano et al., "Water Distribution Networks Resilience Analysis: A Comparison between Graph Theory-Based Approaches and Global Resilience Analysis." Water Resources Management, vol. 33, Issue 8, Jun. 1, 2019, pp. 2925-2940.

Sela et al., "Characterizing Pressure Patterns in a Water Distribution Network Using a High-Frequency Monitoring System and Statistical Modeling:" WDSA / CCWI Joint Conference Proceedings, vol. 1, Jul. 15, 2018, 08 pages.

Srirangaraland et al., "Wavelet-Based Burst Event Detection and Localization in Water Distribution Systems." Journal of Signal Processing Systems, vol. 72, Issue 1, Jul. 1, 2013, pp. 1-16.

Office Action received for Canadian Patent Application No. 2999489, mailed on Dec. 2, 2020, 6 Pages.

Office Action received for Canadian Patent Application No. 3149224, mailed on Nov. 17, 2023, 3 Pages.

Morrow, et al., U.S. Appl. No. 17/899,313 entitled, "Remote Monitoring of Water Distribution System," filed Aug. 30, 2022.

Morrow, et al., U.S. Appl. No. 18/045,737 entitled, Remote Monitoring of Water Distribution System, filed Oct. 11, 2022.

* cited by examiner

EVENT LOCALIZATION IN A WATER DISTRIBUTION SYSTEM

BACKGROUND

Water distribution systems can use pipe networks (which are typically underground) to provide or distribute sanitary water to both residential buildings (e.g., homes) and commercial buildings (e.g., businesses) within a large geographic area. Leaks or blockages that occur within the water distribution system may result in a reduced level of service provided to customers and a loss of valuable water resources. In addition, disturbances occurring within the water distribution system, such as drops in water pressure caused by pipe bursts or the propagation of pressure pulses (which may be caused by valve or pump operations) through the pipe network can indicate or result in problems within the water distribution system that may also affect the level of service provided to customers.

A water monitoring system can be installed in the water distribution system to measure water characteristics and detect disturbance events at different locations or points throughout the water distribution system. The water monitoring system can include one or more sensors installed at multiple locations or nodes throughout the water distribution system. Ideally, the water monitoring system would incorporate a sensor at each node of the water distribution system to provide comprehensive monitoring of the water distribution system. However, having a sensor at each node of the water distribution system is impractical due to the significant time and cost associated with such an implementation. As a result, most water monitoring systems use a limited number of sensors that are located at preselected nodes of the water distribution system.

The water monitoring system can detect disturbance events in the water distribution system by determining when characteristics measured by the sensors deviate from the preselected upper and lower thresholds established for the characteristics. For example, a pressure pulse travelling through the water distribution system may cause several pressure sensors of the water monitoring system to have measurements that exceed the upper threshold for pressure measurements and thereby indicate disturbance events. Currently, when disturbance events are detected by multiple sensors in the water monitoring system, the water monitoring system cannot determine whether multiple disturbance events have occurred in the water distribution system or whether one disturbance event has occurred in the water distribution system that is being detected multiple times. Therefore, it would be advantageous for a water monitoring system to be able to monitor the propagation of a single disturbance event through the water distribution system.

SUMMARY

The present application is directed to an event localization system or architecture that can identify and track disturbance events (e.g., high-speed energy waves manifested as pressure pulses, transients or hydraulic shocks (also referred to as “water hammers”)) in a water distribution system. The event localization system can include a “propagation study” algorithm to determine, in advance, where to install sensors in the water distribution system to optimize the likelihood of identifying and locating future disturbance events. The event localization system can also include an associated mapping algorithm to identify when the same disturbance event has been measured or detected by multiple sensors at different locations in the water distribution system. The event localization system can then visually display the corresponding information related to the disturbance event from the mapping algorithm to show the progression of the disturbance event through the water distribution system.

The event localization system can utilize a hydraulic model of the water distribution system with a pre-constructed “transit time” matrix. The transit time matrix can provide information on the expected time for a disturbance event to travel between two sensor locations. The transit times from the transit time matrix can be used by the event localization system to identify the occurrence of the same disturbance event when disturbance events are sensed independently by multiple sensors at different geophysical locations in the water distribution system. Once a determination has been made that a single disturbance event has occurred, the event localization system can then identify the sequential progression, over time, of that disturbance event across geophysical locations in the water distribution system. Specifically, the general direction and velocity of the disturbance event can be determined.

In an embodiment, the event localization system can analyze the differences in the progression of the identified disturbance event over time, based on information in the hydraulic model such as the materials used for different portions of the water distribution system (e.g., ductile iron pipe versus plastic pipes). The event localization system can also analyze the variability in the measured intensity (i.e., the amplification or dissipation) of the energy associated with the identified disturbance event over time and across geophysical locations in the water distribution system. The event localization system can also analyze for variability in the measured intensity of the energy associated with the identified disturbance event based on information in the hydraulic model such as the materials used for different portions of the water distribution system. The event localization system can then provide a mapping of the identified disturbance event using graduated color symbology to visualize the data generated by the event localization system. For example, the event localization system can display a graduated color symbology to show the intensity of the identified disturbance event along with using the same color tinting to show the time sequencing as to when the identified disturbance event was detected at multiple sensor locations.

In another embodiment, the event localization system can analyze and identify common error factors over multiple event localization determinations and/or simulations to determine where one or more entries in the transit time matrix do not reflect or correspond to the reality experienced in actual data event reporting from the sensors. The error factors can then be used to modify/update certain entries in the transit time matrix to reduce the error contributions of the entries in future simulations. The errors in the transit time matrix can result from the incorporation of erroneous pipe parameters in the hydraulic model or by pipe segment damage which is changing the celerity of that pipe segment. In addition, the repeated identification of error factors in the transit time matrix may be a possible indication of underground pipe damage or partial blockage in a specific segment/link of pipe between two nodes of the water distribution system. The event localization system can also perform a correlation analysis between pipe segment/link properties (e.g., pipe material, pipe diameter, etc.) in the hydraulic model and historical pressure event dampening effects. For example, where multiple events have been historically localized, a common error factor analysis can be applied to refine the hydraulic model transit time values in the transit time matrix to improve the certainty of future event localizations and/or to identify potential pipe links which may have experienced pipe damage.

In yet another embodiment, the event localization system can characterize measured disturbance event parameters such as velocity, amplitude, and rates of change (i.e., rising and falling slopes of the amplitude) of the same disturbance event at multiple sensors such that the parametric characterization of the disturbance event can be matched against a library of historical disturbance event parametric characterizations with known damage histories to predict the likelihood of damage to water distribution system components in the vicinity of each sensor detecting the disturbance event. Further, the parametric characterization of the disturbance event can be matched against a library of historical disturbance event parametric characterizations with known causes to help determine the likely cause of the disturbance event. Once the cause and resulting damage (if any) from the disturbance event are known, the parametric characterization of the disturbance event can be added to the previously mentioned historical library of characterizations for future reference.

In a further embodiment, the event localization system can include an algorithmic method for identifying hydrant locations (i.e., nodes) to be distributed across the water distribution system, at which to install sensors (e.g., pressure sensors) for the detection of disturbance events to maximize the likelihood of subsequently using the event localization system to successfully identify the source or origin node of a subsequent disturbance event. The identification method can use a Monte Carlo simulation process that is executed or ran repeatedly (e.g., hundreds or thousands of times), such that a higher count of simulations can improve the reliability of the simulation results. The Monte Carlo simulation can choose a random presumed event origin node in the water distribution system with one of a range of presumed event triggering pressure readings. The simulation then incorporates the transit times to all other nodes using the transit times matrix, possibly including the amplitude/intensity dissipation factors for each link, where that information has been included in the hydraulic model. The simulation can then calculate the (potentially sensing) nodes with the lowest average transit times for all randomly selected origin nodes. In an embodiment, the (potentially sensing) nodes can be restricted to a subset of the geographic area covered by the water distribution system hydraulic model. Finally, the collection of optimal potentially sensing nodes can be identified, whereby any disturbance event occurring in the water distribution system can be detected by at least 3 sensing nodes (i.e., the minimum count desired for the event localization system) before the amplitude of the disturbance event falls below the event triggering threshold.

One advantage of the present application is the ability to accurately place sensors in a water distribution system to optimize the detection of disturbance events.

Another advantage of the present application is the ability to visualize the progression of a disturbance event through the water distribution system.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

The above and other features of the present application, its nature and various advantages will be more apparent upon consideration of the following detailed description, taken in conjunction with the accompanying drawings.

DETAILED DESCRIPTION

Figure 1:
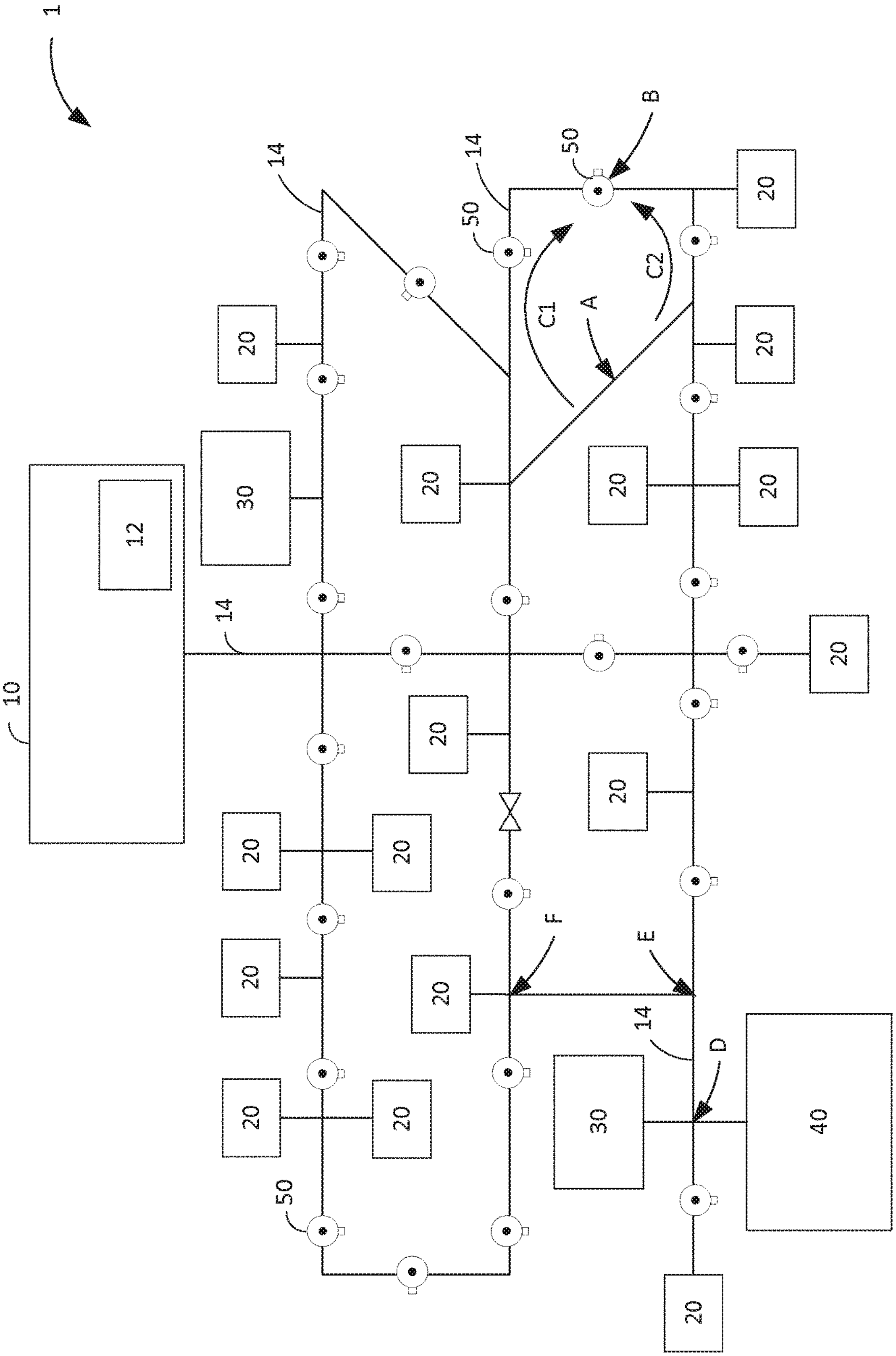
FIG. 1 is a block diagram of a water distribution system in accordance with some embodiments of the present application.

A water distribution system can have a water treatment facility that supplies water to an area such as a municipality, industrial park, commercial area, mixed use area or development, and various other locations and environments. The water can be supplied or distributed from the water treatment facility via water mains of the water distribution system. In addition, fire hydrants can be connected to the water mains and located throughout the water distribution system. The fire hydrants may be either dry-barrel hydrants (with a single main valve) or wet-barrel hydrants (with individual valves for each nozzle) depending on the environment in which the hydrant is to be installed. Whatever the manner of construction, the corresponding valve(s) of the hydrant can be opened to provide water from the water main to one or more nozzles of the hydrant. The water flowing through the water main is pressurized, and in this manner, delivers pressurized water to the fire hydrant.

A typical water distribution system may cover a large geographic area. As a result, even though the water that is provided from the water distribution system may be compliant with legal, regulatory, and customer requirements, it is possible that problems with the water may occur elsewhere within the water distribution system. The problems with the water can include pressure losses within the water distribution system or the introduction of undesirable chemicals or materials at remote locations within the water distribution system.

The fire hydrants can be located throughout the water distribution system and may provide a location for remote monitoring of conditions of the water distribution system such as water pressure, water temperature, water quality, chemical content, solid content, or any other suitable characteristics of the water within the water distribution system. A remote measurement device may be positioned at a location associated with the hydrant where the device is exposed to the water flow of the water distribution system. For example, the device may be positioned at the main valve of the fire hydrant or as an insert that connects to a flange of the fire hydrant. The remote measurement device may include sensors that can measure any suitable characteristics of the water or the water distribution system, such as pressure, temperature, or other characteristics of the water.

The remote measurement device may include a processor that processes the output of the sensors, and in some embodiments, calculates measurement values based on the sensor outputs. The remote measurement device may also include a communication interface that transmits the sensor outputs and other calculated values to a communication network device that is located at the fire hydrant, for example, near the bonnet of the fire hydrant (e.g., within a cap of the fire hydrant or a spool located under the bonnet). The communication network device of the fire hydrant may communicate (through either a wired connection or wirelessly) the information from the remote monitoring device to a central monitoring system of the water distribution system. The central monitoring system may use the communicated information from the hydrants to identify problems within the water distribution system.

In another embodiment, the fire hydrant (both wet-barrel and dry-barrel versions) can incorporate a monitoring system that measures multiple characteristics of the water inside the fire hydrant (via one or more sensors of one or more remote measurement devices) and communicates with the central monitoring system (via the communication network device) to provide alerts when events (or disturbance events) occur at the fire hydrant. Events at the fire hydrant can typically occur when the measured value of at least one characteristic being monitored either rises above a predefined upper limit threshold value for that characteristic for a preselected period (e.g., an explicit time period or a number of measurements corresponding to a time period) or falls below a predefined lower limit threshold value for that characteristic for a preselected period. Such breaches from within "normal" threshold limits or values can sometimes be referred to as threshold excursions, to better clarify the concept that such a breach may continue for a period of time before the measured value (or measurement) of the characteristic returns to a value within the predefined upper and lower threshold limits for the characteristic.

The monitoring system at the hydrant can use high-speed sampling (e.g., 64 samples per second or faster) of water pressure to measure energy characteristics in the water distribution system. In addition, the monitoring system can use slower sampling (e.g., 4-60 samples per hour), when measuring other physical or materials characteristics (e.g., temperature, turbidity, pH, chemical composition and water pressure) of the water. The monitoring system can use two different sampling rates because water and its associated physical characteristics (e.g., temperature, turbidity, chemical composition, etc.) typically move through a water distribution system at a comparatively slow speed (e.g., in the order of 10's of meters per second at maximum speed). In comparison, sound energy, such as transients or water hammers, can move through the water of a water distribution system at a maximum speed of 1,480 meters per second. Thus, the monitoring system must sample more frequently for energy effects than for material characteristics.

When monitoring energy characteristics in water, the monitoring system at the hydrant can use pre- and post-event data capture processes. Only high-speed sampling by the monitoring system can provide the certainty of capturing and profiling information on the vast majority of energy pulses (e.g., amplitude and duration of the pulses) in the water distribution system. Therefore, the high-speed sampling aspect of the data capturing process for energy characteristics can be fundamental to the monitoring of energy characteristics due to the high speed (e.g., sound waves can have a maximum speed of 1,480 meters per second in the water distribution system) and short duration (e.g., in the millisecond range) of energy related events. To contextualize an energy pulse event for subsequent evaluation (e.g., at the central monitoring system), both pre-event data and post-event data may need to be captured by the monitoring system. The pre-event or "normal" situation data can show how quickly the change in water pressure may rise or fall relative to the threshold level when an event is triggered and the post-event or "abnormal" situation data can be used to understand the resulting profile of the event.

The monitoring system at the hydrant can use high-speed sampling to successfully profile energy characteristics (and their associated events) moving through water (or fluids), even while using one or more additional sensors to sample, store and report other water characteristic data using longer periods. In addition, the monitoring system can capture pre- and post-event energy characteristic data separately and using different data capture mechanisms (e.g., a circular buffer for pre-event data and fixed sample buffer for post-event data). Once an event occurs, the monitoring system can prevent or lock the pre-event buffer from updating until the post-event data (along with the pre-event data) has been reported. Once the post-event data has been reported, the pre-event buffer can be used to store energy characteristic data (even while the original event continues), but a new event is not determined until the monitoring system determines that the water distribution system has returned to normal operating conditions after the original event occurred.

FIG. 1 shows a water distribution system 1 in accordance with some embodiments of the present application. In one embodiment, the water distribution system may include a water treatment facility 10 that includes a central monitoring system 12. Water is provided to the water treatment facility 10 from a water source (not depicted). The water treatment facility 10 treats the water that is provided from the water source such that the water complies with legal, regulatory, and customer requirements related to water content and quality. The central monitoring system 12 may receive information from remote measurement devices that are located throughout the water distribution system 1 (e.g., at fire hydrants 50) to ensure that the water delivered to the different locations throughout the water distribution system 1 complies with the legal, regulatory, and customer requirements. Based on the information from the remote measurement devices, the central monitoring system 12 may report problems within the water distribution system 1 and suggest corrective action such as needed repairs at a location of the water distribution system 1.

In one embodiment, the central monitoring system 12 may include an event localization system that can identify locations where there is a water disturbance event (e.g., an unexpected loss of pressure or a pressure pulse) within the water distribution system 1. Based on the information about the water disturbance event, the location in the water distribution system 1 where an inspection or repair may need to be made can be pinpointed accurately. In a similar manner, the central monitoring system 12 may monitor characteristics of the water, such as material or chemical content, at different locations throughout the water distribution system 1. Based on these characteristics, the central monitoring system 12 may identify a location where water quality does not comply with legal, regulatory, or customer requirements. In addition, central monitoring system 12 may monitor other aspects of the water distribution system 1 over time, for example, to determine usage patterns or other changes to the water distribution system 1.

The water that is provided by the water treatment facility 10 may be provided to water main(s) 14. The water main(s) 14 may distribute the water to customers such as residential customers 20, business customers 30, and industrial customers 40. In some embodiments (not depicted herein), remote measurement devices may be located at one or more of these customer locations in addition to the fire hydrants 50 or instead of the fire hydrants 50. However, as described in more detail herein, at least some of the remote measurement devices may be located at the fire hydrants 50 of the water distribution system 1. Locating the remote measurement devices at the fire hydrants 50 may provide some advantages. For example, the party that owns or manages the water distribution system 1 is likely to have access to and at least partial control over the fire hydrants 50 and the operation thereof.

Figure 2:
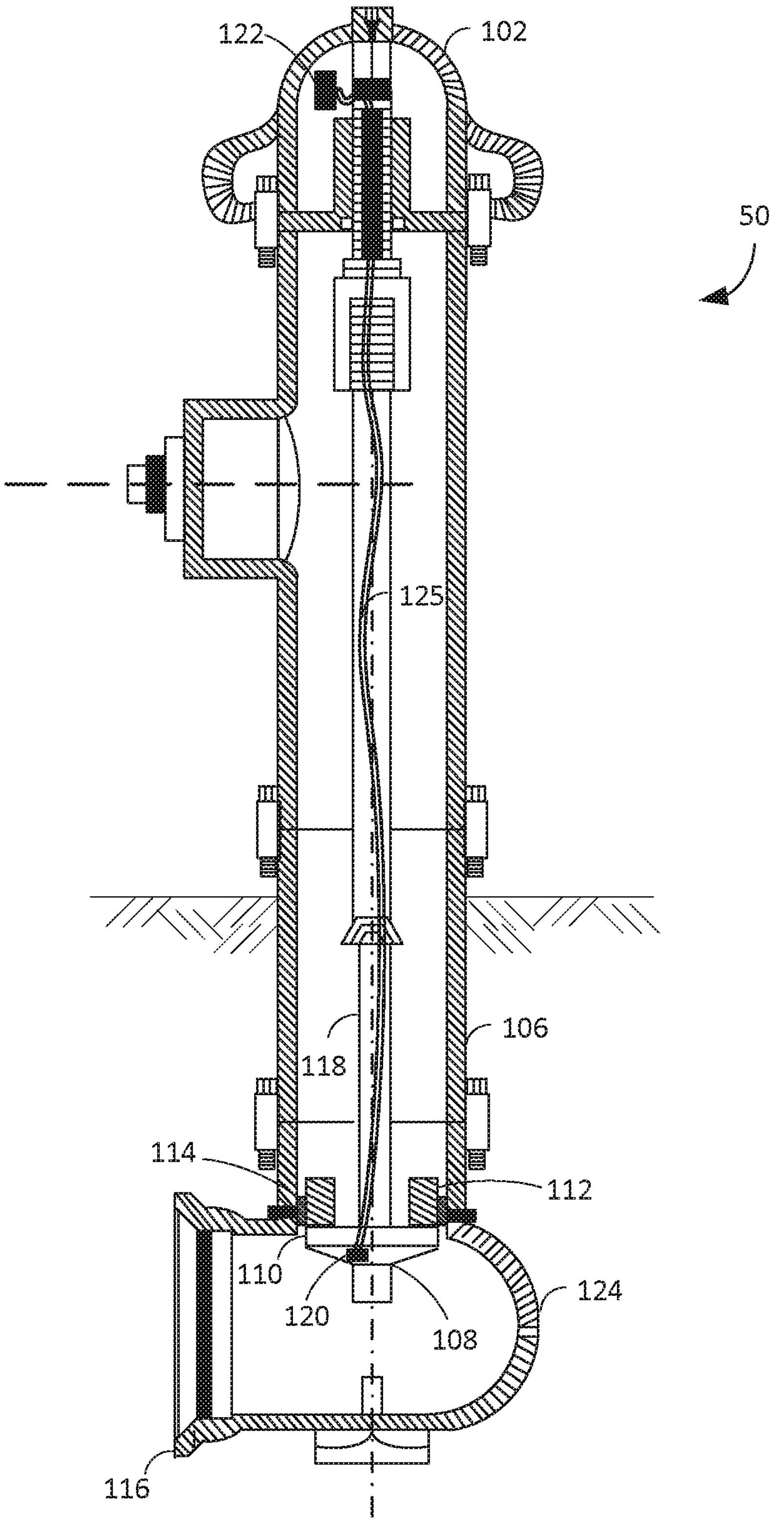
FIG. 2 is a cross-sectional view of a dry-barrel fire hydrant including a remote measurement device in accordance with some embodiments of the present application.

FIG. 2 shows an exemplary fire hydrant 50 including a remote measurement device and communication network device in accordance with some embodiments of the present application. Although any suitable type of fire hydrant may be utilized in accordance with the present application (e.g., a dry-barrel or wet-barrel fire hydrant), in one embodiment as depicted in FIG. 2 the fire hydrant 50 may be a dry-barrel fire hydrant. In one embodiment, the fire hydrant 50 may include a remote measurement device 120 and a communication network device 122. Although certain fire hydrant components are described in accordance with the present application, it will be understood that the remote measurement device 120 and/or communication network device 122 may be implemented at any suitable location within any suitable fire hydrant 50.

In some embodiments, the fire hydrant 50 may include a shoe 124 that connects to a water main 14 (not shown in FIG. 2) via a flange 116. A main valve of the fire hydrant 50 may include a lower valve plate 108 and a valve seat 110. Under normal conditions when water is not being provided to the fire hydrant 50, the lower valve plate 108 may provide a force upon the valve seat 110 such that it creates a seal with seat ring 112 and an upper valve plate (not depicted). A valve stem 118 may be coupled to the lower valve plate 108 such that a user of the fire hydrant may release the seal between the valve seat 110 and the seat ring 112, allowing water from the water main 14 to be provided to the fire hydrant 50 via barrel 106. In some embodiments, seat ring 112 may engage with a drain ring 114, such that the valve stem 118, seat ring 112, and main valve (e.g., including lower valve plate 108 and valve seat 110) may be selectively removed and serviced at the fire hydrant 50. In this manner, a remote measurement device 120 may be accessed and serviced as necessary, for example, to replace a battery of remote measurement device 120. In contrast, in a wet-barrel hydrant, each individual valve stem has a valve seal that closes against the valve seat on the backside of the valve's corresponding nozzle, such that turning each valve stem can retract the valve seal and allow water to flow to and through the individual nozzle. Turning the valve stem in the opposite direction can advance the valve seal against the valve seat to close the valve thereby shutting off the flow of water from that individual nozzle.

In one embodiment, a remote measurement device 120 may be located in a location that is suitable to measure characteristics of the water that is distributed through the water main 14 of the water distribution system 1. For example, the water main 14 may be coupled to the shoe 124 via flange 116. Although the remote measurement device 120 may be located in any suitable location that is in contact with the water provided by water main 14 (e.g., at any location of shoe 124), in one embodiment the remote measurement device 120 may be located at an exposed surface of the lower valve plate 108.

The remote measurement device 120 may include any suitable components to provide for measurement of characteristics of water provided by the water main 14. In one embodiment, the remote measurement device 120 may include a plurality of sensors that measure characteristics of the water such as pressure, temperature, turbidity, heave, material content (e.g., total dissolved solids), biological content, chemical content (e.g., chlorine), or any other suitable characteristics. The measured characteristics may be processed at the remote measurement device 120, or some or all of the outputs of the plurality of the sensors may be provided to another device (e.g., communication network device 122) for further processing. In some embodiments, the remote measurement device 120 may communicate with the communication network device 122 via a standardized wireless communication protocol (e.g., WiFi, ZigBee, Bluetooth, Bluetooth low energy, etc.) or proprietary wireless communication protocol operating at frequency such as 900 MHz, 2.4 GHz, or 5.6 GHz.

In other embodiments, the remote measurement device 120 may communicate with a communication network device 122 via a wired connection, for example, that is routed through a cavity of valve stem 118 or a tube 125 attached to the valve stem 118 or that is positioned along an interior surface of barrel 106. Any suitable signals or combination thereof may be provided via the wired connection, including but not limited to sensor signals from remote measurement device 120, data signals between remote measurement device 120 and communication network device 122, and power signals provided to remote measurement device 120 and communication network device 122. In one embodiment, remote measurement device 120 may receive power via wired connection and may provide analog or digital signals directly from sensors of remote measurement device 120. In another embodiment, remote measurement device 120 may process some or all of the signals received at sensors thereof and communicate values determined therefrom to communication network device 122 via a data signal. A data signal may be provided by any suitable standardized or proprietary protocol, such as USB, $I^2C$, GPIO, SPI, or Firewire.

In one embodiment, communication network device 122 may be located at a location of fire hydrant 50 that is located above ground, for example, at a location within bonnet 102 of the fire hydrant 50. However, it will be understood that communication network device 122 may be located at any suitable location of fire hydrant 50, including an interior or exterior surface of fire hydrant 50. In addition, in some embodiments, the communication network device 122 and the remote measurement device 120 may be integrated as a single component (e.g., with the communication network device 122 located with remote measurement device 120 at a location that is in contact with water from water main 14, or in a wet-barrel fire hydrant 50).

Communication network device 122 may be in communication with the remote measurement device 120 and may also be in communication with a communication network and/or central monitoring system 12. In some embodiments, communication network device 122 may also be in communication with other communication devices such as communication network devices 122 of other fire hydrants 50 within the water distribution system 1. As described herein, the communication network device 122 may include a wired or wireless communication interface that is compatible with the remote measurement device 120 as well as one or more additional wireless communication interfaces for communicating with the communication network and central monitoring system 12, such as a cellular communication network or mesh communication network. In an embodiment of a cellular communication network, the communication network device 122 may communicate in any suitable manner, such as via internet protocol data communication or short message system (SMS) messages. In an embodiment of a mesh communication system, data may be transmitted to the central monitoring system 12 via the mesh network or using a data collection procedure (e.g., using a service vehicle to survey the communication network devices 122 at hydrants 50).

Figure 3:
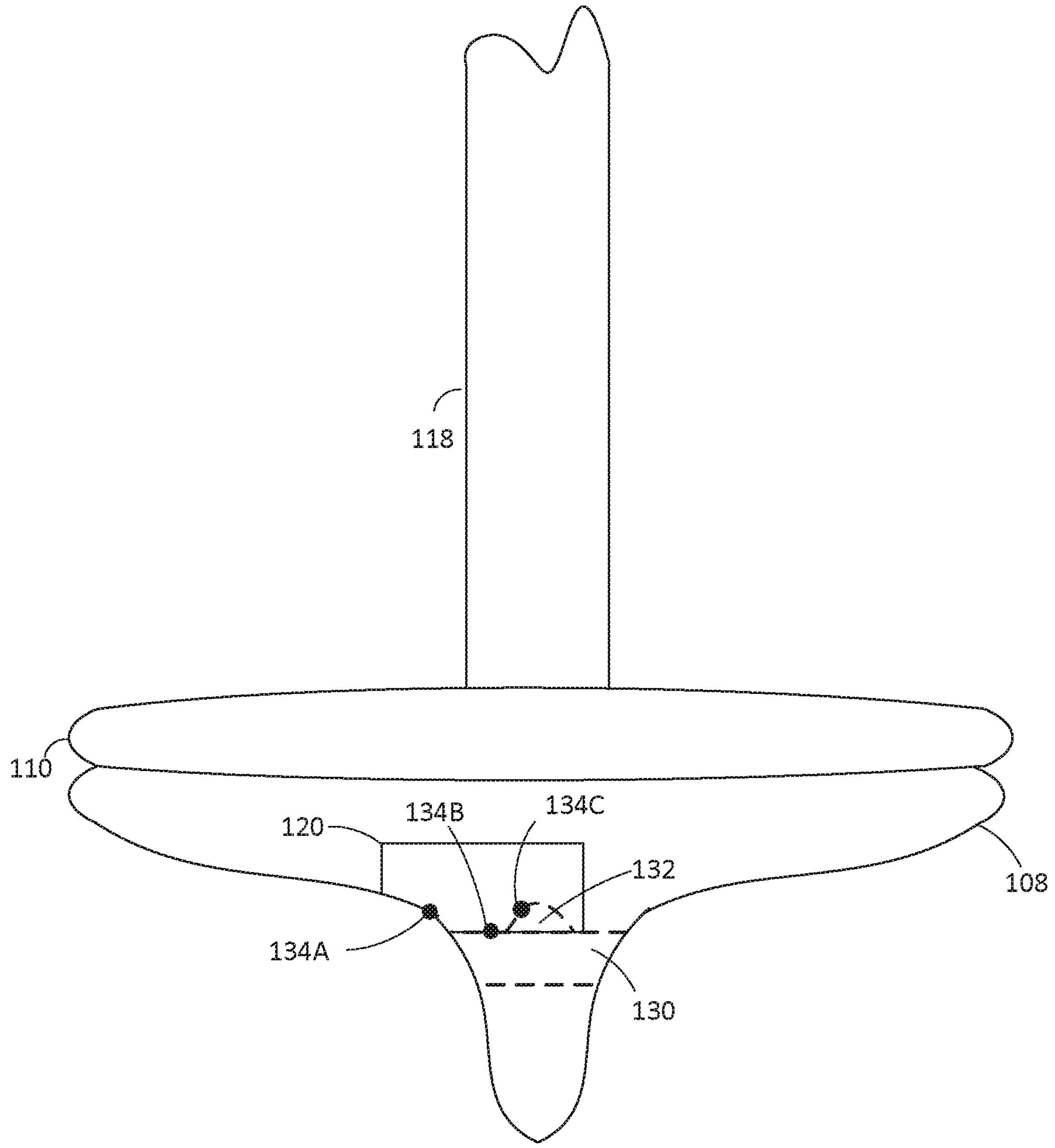
FIG. 3 is a side view of a remote measurement device located within a cavity of a lower valve plate of a dry-barrel fire hydrant in accordance with some embodiments of the present application.

FIG. 3 shows a remote measurement device 120 located within a cavity of a lower valve plate 108 of the main valve of a fire hydrant 50 in accordance with some embodiments of the present application. As described herein, a remote measurement device 120 may be integrated into any suitable component of a fire hydrant 50 that is in contact with water supplied by a water main 14. In one embodiment, the remote measurement device 120 may be integral to the lower valve plate 108 (e.g., located within a cavity of the lower valve plate 108). The lower valve plate 108 may have a sealing surface that creates a seal with the valve seat 110 and an exposed surface located opposite the sealing surface.

Remote measurement device 120 may include sensors 134 that may determine characteristics of the water of water main 14. Examples of sensors 134 may include pressure sensors, temperature sensors, turbidity sensors, heave sensors, sensors for material content (e.g., total dissolved solids), sensors for biological content, sensors for chemical content (e.g., chlorine), or sensors for any other suitable characteristics. Sensors 134 may be configured as electrical sensors, mechanical sensors, electromechanical sensors, optical sensors, acoustic sensors, any other suitable type of sensor, or any combination thereof.

In some embodiments, sensors 134 may be provided at a variety of locations of lower valve plate 108 or another similar component. As depicted in FIG. 3, sensor 134A may be provided at an exterior surface of lower valve plate 108. In some embodiments, a channel 130 may be provided through lower valve plate 108. As depicted in FIG. 3, a sensor 134B may be located at the surface of channel 130, or in some embodiments, within channel 130. A reservoir 132 may also be provided within lower valve plate 108, and one or more sensors 134C may be provided within reservoir 132. In some embodiments, the sensors 134B or 134C located at or in the channel 130 or reservoir 132 may include a liquid sampling device that is configured to acquire a sample of the liquid and to determine the one or more characteristics based on the sample.

Figure 4:
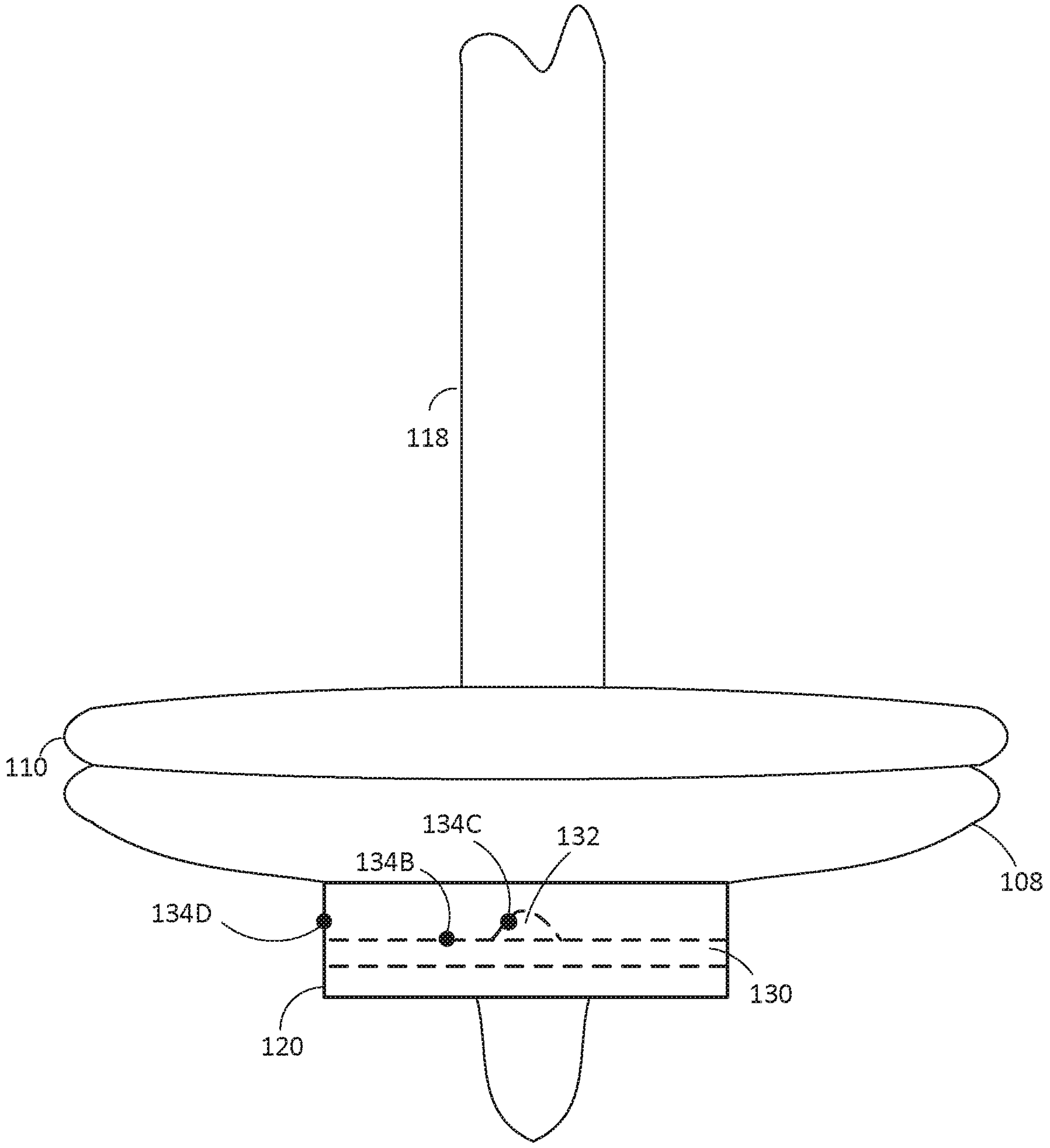
FIG. 4 is a side view of a remote measurement device located at an exterior surface of a lower valve plate of a dry-barrel fire hydrant in accordance with some embodiments of the present application.

FIG. 4 shows a remote measurement 120 device located at an exterior surface of a lower valve plate 108 of the main valve of a fire hydrant 50 in accordance with some embodiments of the present application. As described herein, a remote measurement device 120 may be located at an exterior surface of any suitable component of a fire hydrant 50 that is in contact with water supplied by a water main 14. In one embodiment, the remote measurement device 120 may be fixedly attached to the lower valve plate 108 (e.g., via a weld, bolt, or any other suitable attachment mechanism). The lower valve plate 108 may have a sealing surface that creates a seal with the valve seat 110 and an exposed surface located opposite the sealing surface, to which the remote measurement device 120 is attached.

Similar to FIG. 3, remote measurement device 120 may include sensors 134 that may determine characteristics of the water of water main 14. Examples of sensors 134 may include pressure sensors, temperature sensors, turbidity sensors, heave sensors, sensors for material content (e.g., total dissolved solids), sensors for biological content, sensors for chemical content (e.g., chlorine), or sensors for any other suitable characteristics. Sensors 134 may be configured as electrical sensors, mechanical sensors, electromechanical sensors, optical sensors, acoustic sensors, any other suitable type of sensor, or any combination thereof. In an embodiment utilizing the tube 125 (see FIG. 2) attached to the valve stem 118 for the wired connection, the tube 125 may also simultaneously operate as an air tube for the local elevation air pressure to reach the back-side of a pressure sensor of sensors 134, enabling the pressure sensor to be a "relative" pressure sensor instead of an "absolute" pressure sensor with no elevation reference and which would require an offset everywhere except at sea level.

In some embodiments, sensors 134 may be provided at a variety of locations of the remote measurement device 120. Sensors 134 may be provided at an exterior surface of remote measurement device 120 (sensor 134D), at or within a channel 130 of remote measurement device 120 (sensor 134B), and/or at or within a reservoir 132 of remote measurement device 120 (sensor 134C).

In another embodiment, the remote measurement device or remote monitoring device 120 can include an acoustic hydrophone as one of the sensors 134 that is incorporated into the lower valve plate 108 of the main valve. The acoustic hydrophone can be used for leak detection in the water distribution system 1 as described in more detail in U.S. patent application Ser. No. 17/012,625 entitled Remote Monitoring of Water Distribution System, which application is incorporated herein by reference.

Figure 5:
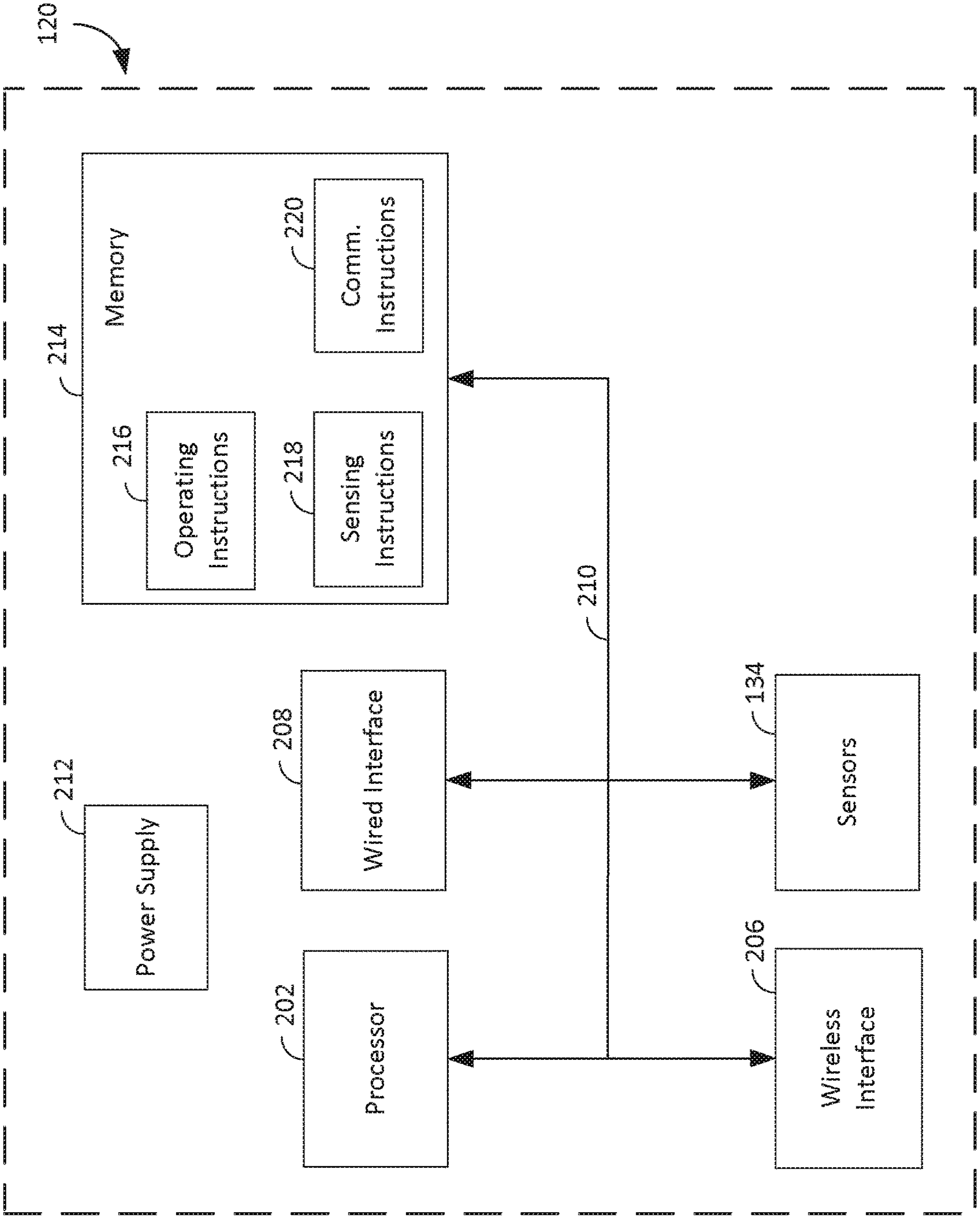
FIG. 5 is a block diagram of a remote measurement device in accordance with some embodiments of the present application.

FIG. 5 shows a remote measurement device 120 in accordance with some embodiments of the present application. Although remote measurement device 120 may include any suitable components, in one embodiment remote measurement device 120 may include a processor 202, sensors

134, a wireless interface 206, a wired interface 208, internal communication interface 210, a power supply 212, and a memory 214.

Processor 202 may control the operations of the other components of remote measurement device 120 and may include any suitable processor. As described herein, a processor 202 may include any suitable processing device such as a general-purpose processor or microprocessor executing instructions from memory, hardware implementations of processing operations (e.g., hardware implementing instructions provided by a hardware description language), any other suitable processor, or any combination thereof. In one embodiment, processor 202 may be a microprocessor that executes instructions stored in memory 214. Memory includes any suitable volatile or non-volatile memory capable of storing information (e.g., instructions and data for the operation and use of remote measurement device 120 and communication network device 122), such as RAM, ROM, EEPROM, flash, magnetic storage, hard drives, any other suitable memory, or any combination thereof.

Processor 202 of remote measurement device 120 may be in communication with sensors 134 via internal communication interface 210. Internal communication interface 210 may include any suitable interfaces for providing signals and data between processor 202 and other components of remote measurement device 120. This may include communication buses such as $I^2C$, SPI, USB, UART, and GPIO. In some embodiments, this may also include connections such that signals from sensors 134 (e.g., measured analog signals) may be provided to processor 202.

Wireless interface 206 may be in communication with processor 202 via the internal communication interface 210 and may provide for wireless communication with other wireless devices such as communication network device 122. Wireless interface 206 may communicate using a standardized wireless communication protocol (e.g., WiFi, ZigBee, Bluetooth, Bluetooth low energy, etc.) or proprietary wireless communication protocol operating at any suitable frequency such as 900 MHz, 2.4 GHz, or 5.6 GHz. In some embodiments, a suitable wireless communication protocol may be selected or designed for the particular signal path between the remote measurement device 120 and communication network device 122. In an embodiment of a remote measurement device 120 implemented with lower valve plate 108, the wireless communication protocol may be selected based on the material properties of the fire hydrant 50 (e.g., cast iron) and the signal path through the interior cavity of the fire hydrant 50 (including when water is provided to fire hydrant 50). In an embodiment of a remote measurement device 120 implemented with a flange insert, the wireless communication protocol may be selected based on the transmission path through the soil to the above-ground portion of the fire hydrant 50

Although in some embodiments a remote measurement device 120 may include both a wireless interface 206 and a wired interface 208, in some embodiments only one of the wireless interface 206 or wired interface 208 may be provided. A wired interface 208 may provide an interface with a wired connection in order to allow processor 202 to communicate with communication network device 122 as described herein. The wired interface 208 may be any suitable wired connection to facilitate communication via any suitable protocol, as described herein.

Remote measurement device 120 may also include a power supply 212. Power supply may include a connection to an external power supply (e.g., power supplied by a wired connection), a battery power source, any other suitable power source, or any combination thereof. In some embodiments, power supply 212 may be a replaceable or rechargeable battery such as lithium-ion, lithium-polymer, nickel-metal hydride, or nickel-cadmium battery. The power supply 212 may provide power to the other components of remote measurement device 120.

In one embodiment, memory 214 of remote measurement device may include memory for executing instructions with processor 202, memory for storing data, and a plurality of sets of instructions to be run or executed by processor 202. Although memory 214 may include any suitable instructions, in one embodiment the instructions may include operating instructions 216, sensing instructions 218, and communication instructions 220.

Operating instructions 216 may include instructions for controlling the general operations of the remote measurement device 120. In one embodiment, operating instructions 216 may include instructions for an operating system of the remote measurement device 120, and for receiving updates to software, firmware, or configuration parameters of the remote measurement device 120. In one embodiment, remote measurement device 120 may be a battery-powered device that may be in use for long periods of time without being replaced. Operating instructions 216 may include instructions for limiting power consumption of the remote measurement device 120, for example, by periodically placing some of the components of the remote measurement device 120 into a sleep mode. In one embodiment, the sensors 134 and the communication interface (e.g., wireless interface 206 and/or wired interface 208) may be shut off and many of the processing operations of the processor 202 may be shut off. In some embodiments, sensing with sensors 134 may only occur on relatively long intervals (e.g., every few minutes) while the processor 202 may check the communication interface (e.g., wireless interface 206 and/or wired interface 208) more frequently to determine whether data has been requested by the communication network device 122. In other embodiments, sensing with sensors 134 may occur more frequently, and the communication interface (e.g., wireless interface 206 and/or wired interface 208) may only be powered on relatively infrequently (e.g., every few hours), or if a warning or error should be provided based on the measurements from the sensors 134. In an embodiment, warnings may include conditions that relate to problems with the water distribution system 1, such as water pressure issues and water quality issues (e.g., turbidity, solid content, chemical content, biological content, etc.).

Sensing instructions 218 may include instructions for operating the sensors 134 and for processing data from the sensors 134. As described herein, sensors 134 may include a variety of types of sensors that measure a variety of different characteristics of the water. Sensing instructions 218 may provide instructions for controlling these sensors, determining values based on signals or data received from the sensors 134, and performing calculations based on the received signals or data. While in some embodiments, raw sensor data or calculated values may be received or calculated based on the sensing instructions 218, in some embodiments the sensing instructions 218 may also include data analysis such as a comparison of values with corresponding threshold or warning values, a rate of change for values, or a combination of values that is indicative of a particular water condition. For example, if the pressure that is sensed at a pressure sensor of sensors 134 falls below a threshold, sensing instructions 218 may provide for a warning to be provided to communication network device 122. If a chemical or biological content of the water exceeds a threshold parts per million, a warning may be provided to communication network device 122. In some embodiments, sensing instructions 218 may also analyze data trends or perform statistical analysis based on data received from the sensors 134, determine warnings therefrom, and provide the trends, statistics, and/or warnings to the communication network device 122.

Communication instructions 220 may include instructions for communicating with other devices such as communication network device 122. Communications instructions may include instructions for operating the wireless interface 206 and/or wired interface 208, including physical layer, MAC layer, logical link layer, and data link layer instructions to operate the wireless interface 206 and/or wired interface 208 in accordance with a standardized or proprietary communication protocol. Communication instructions 220 may also include instructions for encrypting and decrypting communications between remote measurement device 120 and communication network device 122, such that unauthorized third parties are unable to eavesdrop on such communications. Communication instructions 220 may also include instructions for a message format for communications exchanged between remote measurement device 120 and communication network device 122. The message format may specify message types, such as warning messages, wake up messages, update messages, data upload messages, and data request messages.

Figure 6:
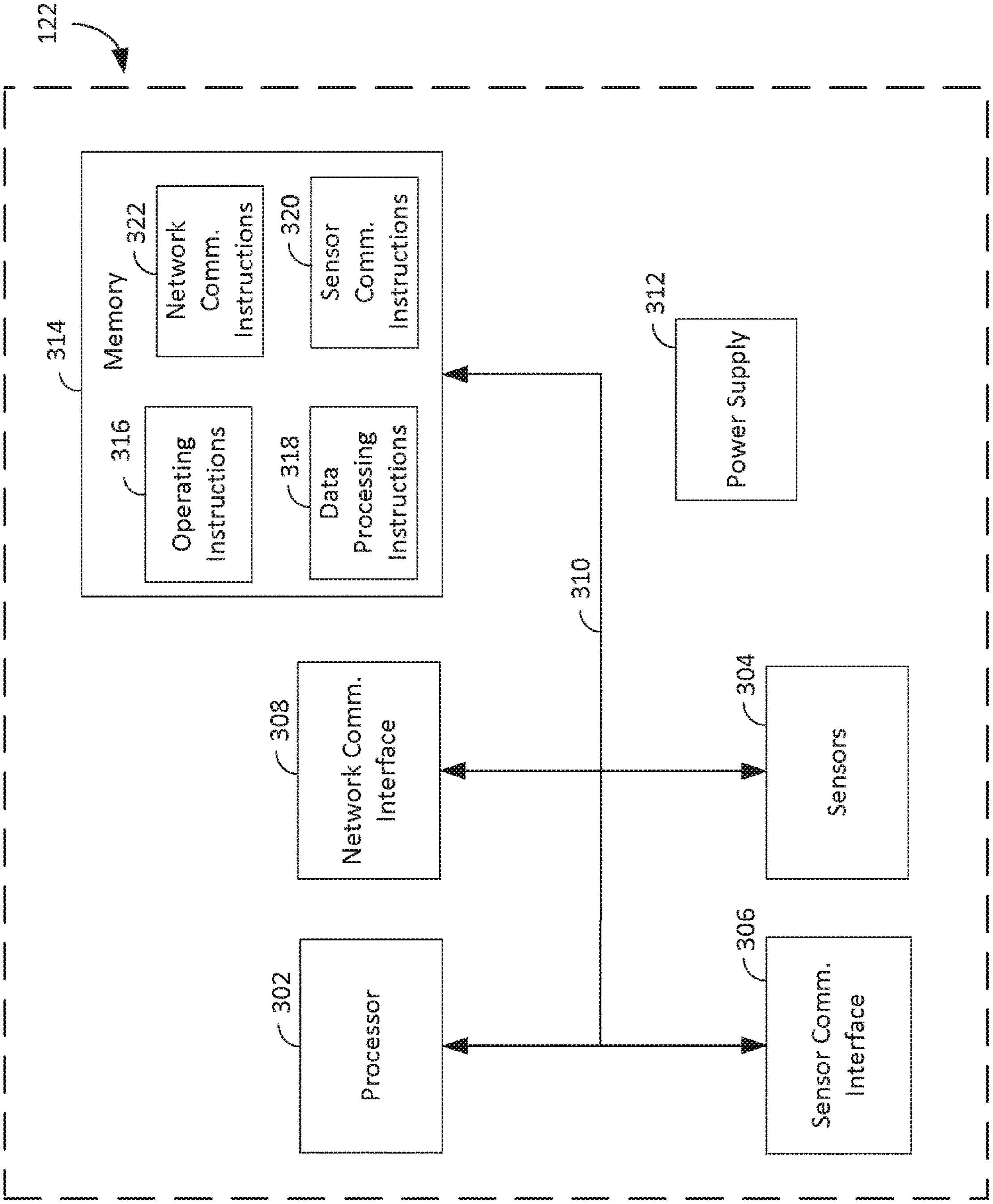
FIG. 6 is a block diagram of a communication network device in accordance with some embodiments of the present application.

FIG. 6 shows a communication network device 122 in accordance with some embodiments of the present application. Although communication network device 122 may include any suitable components, in one embodiment communication network device 122 may include a processor 302, sensors 304, a sensor communication interface 306, a network communication interface 308, internal communication interface 310, power supply 312, and memory 314.

Processor 302 may control the operations of the other components of communication network device 122 and may include any suitable processor. A processor 302 may include any suitable processing device such as a general-purpose processor or microprocessor executing instructions from memory, hardware implementations of processing operations (e.g., hardware implementing instructions provided by a hardware description language), any other suitable processor, or any combination thereof. In one embodiment, processor 302 may be a microprocessor that executes instructions stored in memory 314. Memory includes any suitable volatile or non-volatile memory capable of storing information (e.g., instructions and data for the operation and use of communication network device 122), such as RAM, ROM, EEPROM, flash, magnetic storage, hard drives, any other suitable memory, or any combination thereof.

In some embodiments, communication network device 122 may include sensors 304. For example, communication network device 122 may be combined with remote measurement device 120, such that they operate as a single unit. In other embodiments, the sensing operations may be performed directly at communication network device 122, such as when water is provided to communication network device 122 by a pitot tube. In addition, communication network device 122 may sense other characteristics about the location where it is located within fire hydrant 50, such as temperature.

Sensor communication interface 306 may be in communication with processor 302 via the internal communication interface 310 and may provide for wireless or wired communications with remote measurement device 120. In one embodiment, sensor communication interface 306 may include a wireless interface that communicates using a standardized wireless communication protocol (e.g., WiFi, ZigBee, Bluetooth, Bluetooth low energy, etc.) or proprietary wireless communication protocol operating at any suitable frequency such as 900 MHz, 2.4 GHz, or 5.6 GHz. As described herein, a suitable wireless communication protocol may be selected or designed for the particular signal path between the remote measurement device 120 and communication network device 122. In some embodiments, sensor communication interface 306 may be a wired interface that provides an interface with the wired connection to allow processor 302 to communicate with remote measurement device 120 as described herein. The wired connection may be any suitable wired connection to facilitate communication via any suitable protocol, as described herein.

Network communication interface 308 may be in communication with a communication network for monitoring characteristics of the water distribution system 1. In one embodiment, the network communication interface 308 may provide for communications with a central monitoring system 12, such as by using a cellular communication network or mesh communication network. In an exemplary embodiment of a cellular communication network, the communication network device 122 may communicate in any suitable manner, such as via internet protocol data communications or short message system (SMS) messages. In an exemplary embodiment of a mesh communication system, data may be transmitted to the central monitoring system 12 via the mesh network or using a data collection procedure (e.g., using a service vehicle to survey the communication network devices 122 at fire hydrants 50).

Communication network device 122 may also include a power supply 312. Power supply 312 may include a connection to an external power supply (e.g., power supplied by a utility system), a battery power source, any other suitable power source, or any combination thereof. In some embodiments, power supply 312 may be a replaceable or rechargeable battery such as lithium-ion, lithium-polymer, nickel-metal hydride, or nickel-cadmium battery. The power supply may provide power to the other components of communication network device 122.

In one embodiment, memory 314 of communication network device 122 may include memory for executing instructions with processor 302, memory for storing data, and a plurality of sets of instructions to be run by processor 302. Although memory 314 may include any suitable instructions, in one embodiment the instructions may include operating instructions 316, data processing instructions 318, sensor communication instructions 320, and network communication instructions 322.

Operating instructions 316 may include instructions for controlling the general operations of the communication network device 122. In one embodiment, operating instructions may include instructions for an operating system of the communication network device 122, and for receiving updates to software, firmware, or configuration parameters of the communication network device 122. In one embodiment, communication network device 122 may be a battery-powered device that may be in use for long periods of time without being replaced. Operating instructions 316 may include instructions for limiting power consumption of the communication network device 122, for example, by periodically placing some of the components of the communication network device 122 into a sleep mode. In one embodiment, the sensors 304 and the communication interfaces (e.g., sensor communication interface 306 and network communication interface 308) may be shut off and many of the processing operations of the processor 302 may be shut off. The communication interfaces may wake up on a periodic basis to check for messages from the remote measurement device 120 or the communication network. In some embodiments, the wake-up times may be scheduled based on messages from one or more of the central monitoring system 12, remote measurement device 120, and/or communication network device 122. In some embodiments, communication network device 122 may not enter the sleep mode while processing certain information such as warning messages or error messages (e.g., to monitor more frequently based on the occurrence of an error or warning).

Data processing instructions 318 may include instructions for processing data that is received from the remote measurement device 120 via the sensor communication interface 306. As described herein, the sensors 304 of the remote measurement device may measure characteristics such as pressure, turbidity, temperature, heave, material content (e.g., total dissolved solids), biological content, chemical content (e.g., chlorine), or any other suitable characteristics. The data processing instructions 318 may process this data to determine warnings, monitor data trends, calculate statistics, or perform any other suitable data processing operations as described herein. In one embodiment, data processing instructions 318 may include instructions for monitoring the change in water pressure over time, and based on identified changes, may provide messages such as warning messages to central monitoring system 12.

Sensor communication instructions 320 may include instructions for communicating with remote measurement device 120. Sensor communications instructions may include instructions for operating the sensor communication interface 306, including physical layer, MAC layer, logical link layer, and data link layer instructions in accordance with a standardized or proprietary communication protocol. Sensor communication instructions 320 may also include instructions for encrypting and decrypting communications between remote measurement device 120 and communication network device 122, such that unauthorized third parties are unable to eavesdrop on such communications. Sensor communication instructions 220 may also include instructions for a message format for communications exchanged between remote measurement device 120 and communication network device 122. The message format may specify message types, such as warning messages, wake up messages, update messages, data upload messages, and data request messages.

Network communication instructions 322 may include instructions for communicating with a communication network such as a cellular network and/or mesh network. In one embodiment, network communication instructions 322 may include instructions for communicating on a cellular network using an internet protocol data format or an SMS data format. Network communication instructions 322 may also include instructions for communicating using a mesh network (e.g., ZigBee). Communication instructions 320 may also include instructions for encrypting and decrypting communications between communication network device 122 and the communication network, such that unauthorized third parties are unable to eavesdrop on such communications. Communication instructions 320 may also include instructions for a message format for communications exchanged between communication network device 122 and the communications network. The message format may specify message types, such as warning messages, wake up messages, update messages, data upload messages, and data request messages. Additional information regarding the operation and configuration of the remote monitoring device 120 and the communication network device 122 is described in more detail in U.S. Pat. No. 11,460,459 entitled Remote Monitoring of Water Distribution System, which patent is incorporated herein by reference.

Figure 7:
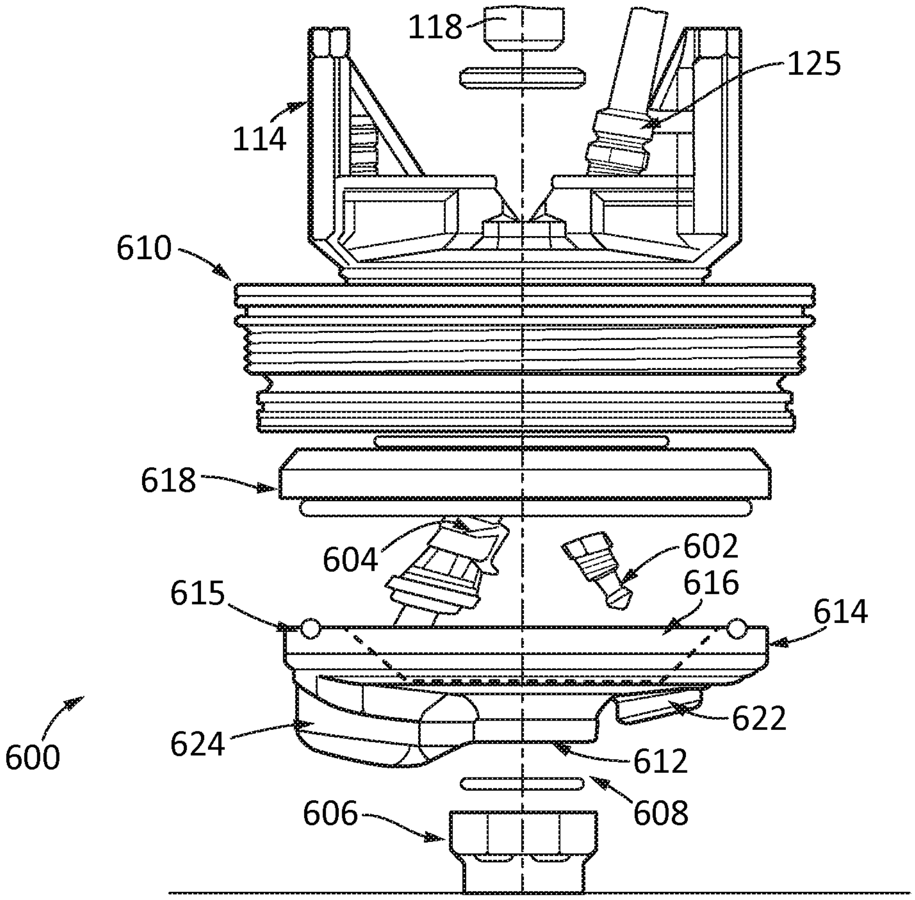
FIG. 7 is an exploded view of the main valve for a dry-barrel fire hydrant with pressure and temperature sensors in accordance with an embodiment of the present application.

FIG. 7 shows an exploded view of an embodiment of a lower valve assembly 600. In the embodiment of FIG. 7, a temperature sensor 602 can be used in conjunction with a pressure sensor 604 that is also incorporated in the lower valve assembly 600. The temperature sensor 602 and the pressure sensor 604 can be connected to the remote monitoring device 120, which may be located in an upper portion of the hydrant 50, by a wired connection located in tube 125 in one embodiment. In another embodiment, the remote monitoring device 120 may be located in the lower valve assembly 600.

The lower valve assembly 600 can be connected to the valve stem 118 by a lock nut 606 in one embodiment. A gasket or an O-ring 608 can be used with the lock-nut 606 to provide a waterproof connection between the valve stem 118 and the lock nut 606. The lower valve assembly 600 can include an upper valve plate 610 connected to a lower valve plate 612. Positioned between the upper valve plate 610 and the lower valve plate 612 is a valve seal 618. In one embodiment, the upper valve plate 610, the lower valve plate 612 and the valve seal 618 are connected or locked together such that the components move as a single piece to open or close the valve. The lower valve plate 612 can have a lower portion 614 with a cavity 616 therein. In one embodiment, the lower valve plate 612 can have a shape similar to a shallow bowl. The valve seal 618 can be positioned on the lower portion 614 to enclose the cavity 616 in the lower valve plate 612. In one embodiment, a gasket, an O-ring or other suitable mechanism 615 can be positioned between the valve seal 618 and the lower portion 614 to form a waterproof seal between the valve seal 618 and the lower portion 614. The pressure sensor 604 and the temperature sensor 602 can be located in the cavity 616. At least a portion of the pressure sensor 604 can extend through the lower portion 614 of the lower valve plate 612 and into contact with the water in the shoe 124. The pressure sensor 604 can be positioned in a pressure sensor enclosure 624 to provide some protection to the pressure sensor 604 and ensure that the pressure sensor 604 is oriented properly. Similarly, the temperature sensor 602 can extend through the lower portion 614 of the lower valve plate 612 and into contact with the water in the shoe 124. The temperature sensor 602 can be positioned in an enclosure 622 to provide some protection to the temperature sensor 602 and ensure that the temperature sensor 602 is oriented properly.

The corresponding wires (not shown) from the temperature sensor 602 and the pressure sensor 604 can pass through corresponding passageways (or openings) in the valve seal 618 (not shown) and passageways (or openings) in the upper valve plate 610 (not shown) and travel to the upper portion of the hydrant 50 via the tube 125. In one embodiment, the passageway in the upper valve plate 610 may include a rubber seal to prevent water from entering the upper valve plate 610 and cavity 616 while still permitting the wire(s) to pass through the upper valve plate 610 to the tube 125.

Figure 8:
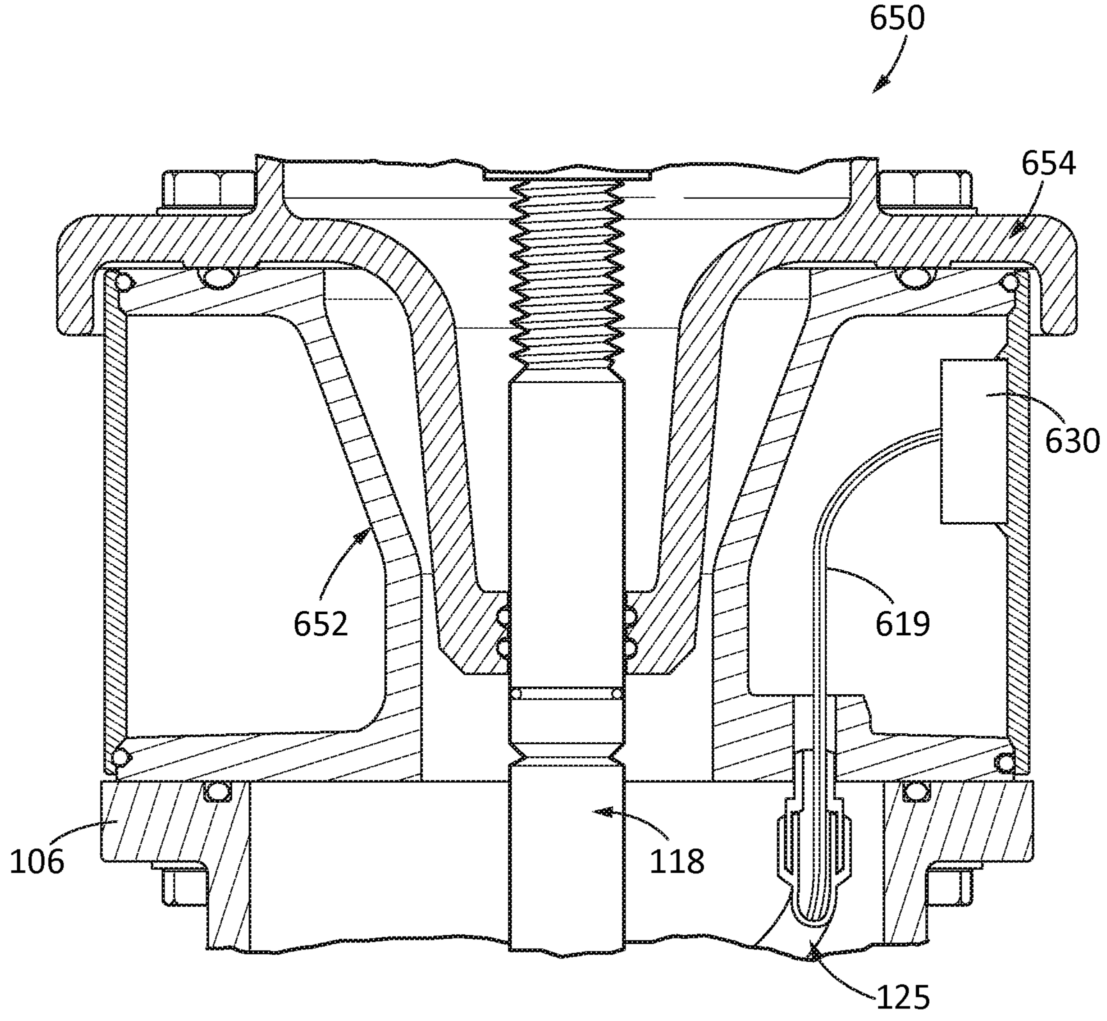
FIG. 8 is a partial cross-sectional view of the upper portion of a dry-barrel fire hydrant in accordance with an embodiment of the present application.

FIG. 8 shows an embodiment of the upper portion of the hydrant 50. The upper portion 650 of the hydrant 50 can include an upper portion of the barrel 106, a bonnet 654 connected to the valve stem 118 and a spool 652 located between the bonnet 654 and the upper portion of the barrel 106. The tube 125 can be connected to a passageway (or opening) in the spool 652. In one embodiment, the passageway in the spool 652 may include a rubber seal to prevent water from entering the spool 652 while still permitting wire(s) 619 from the wired connection in the tube 125 to pass through the spool 652 to the communication device 630. Each end of the tube 125 includes matched fittings with pipe thread sealant that engage with either the top surface of the upper valve plate 610 at the bottom of the hydrant 50 or the lower face of the spool 652 at the upper portion of the hydrant 50. On the other end of the fitting (the portion of the fitting opposite the threads), the tube is grasped by a compression threaded joint where a tightening nut compresses or squeezes the compression ring around the outer circumference of the tube. The use of the tube creates an outside air pressure passageway all the way to the chamber inside the lower valve plate 612 and to the backside of the pressure sensor 604. In an embodiment, the pressure sensor 604 can be a relative pressure sensor that uses the supply of external air pressure provided by the tube 125 to the backside of the pressure sensor 604 to more accurately measure water pressure without the need to perform local calibrations on the pressure sensor 604 to account for the elevation of the pressure sensor 604 relative to sea level. In other words, the providing of external air pressure to the backside of the pressure sensor enables the pressure sensor 604 to report a locally accurate pressure at any elevation. In other embodiments, the pressure sensor 604 can be an absolute pressure sensor that is calibrated for the elevation at which the pressure sensor 604 is being used.

One or more wires 619 from the wired connection in tube 125 can be connected to a communication device 630 located in the spool 652 of the upper barrel 650. The communication device 630 can include a microprocessor and communication equipment (such as a transceiver or cellular equipment) to permit the communication device 630 to communicate with the central monitoring system 12 and process signals and/or data from the temperature sensor 602 and the pressure sensor 604. In one embodiment, the communication device 630 can incorporate the communication network device 122 and/or the remote monitoring device 120. Each of the hydrants 50 in the water distribution system 1 (or a subset thereof) can communicate the temperature information from the temperature sensor 602 and the pressure (and energy) information from the pressure sensor 604 to the central monitoring system 12.

In one embodiment, the temperature sensor 602 can continuously collect the temperature information from the water. However, in other embodiments, the temperature sensor 602 can intermittently collect temperature information from the water at either predefined intervals or at random times. The collected temperature information can be digitized by an analog to digital circuit on a circuit board of the communication device 630 before being transmitted to the central monitoring system 12. In another embodiment, the collected temperature information can be digitized by an analog to digital circuit in the remote monitoring device 120 and then provided to the communication device 630 for transmission to the central monitoring system. In one embodiment, the communication device 630 can include one or more memory devices to store the digitized temperature information at the communication device 630 for some rolling period of time (e.g., last 24 hours) before transmitting the information to the central monitoring system 12. In another embodiment, the communication device 630 can provide the temperature information stored in the memory devices to the central monitoring system 12 in response to a request from the central monitoring system 12.

Figure 11:
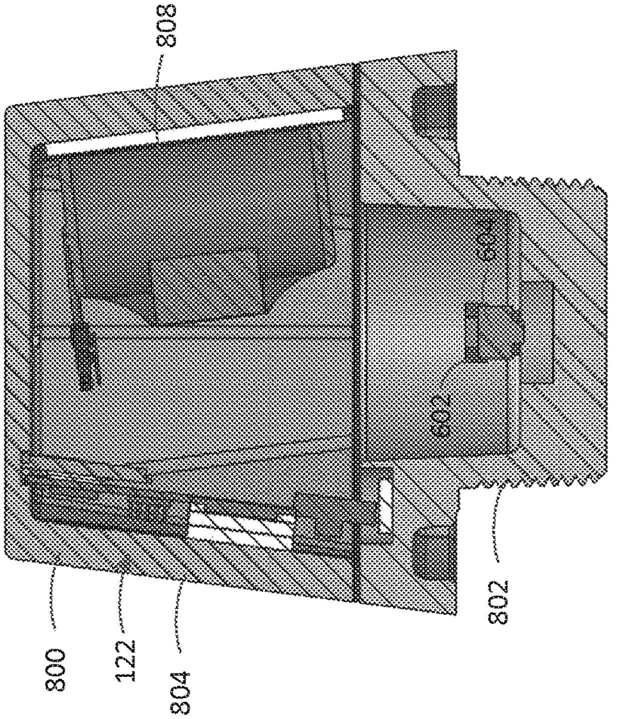
FIG. 11 shows a cross-sectional view of the cap of FIG. 10 taken along line 11-11.
Figure 9:
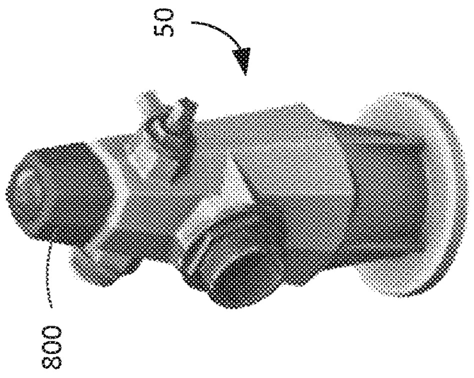
FIG. 9 is a perspective view an embodiment of a wet-barrel hydrant.
Figure 10:
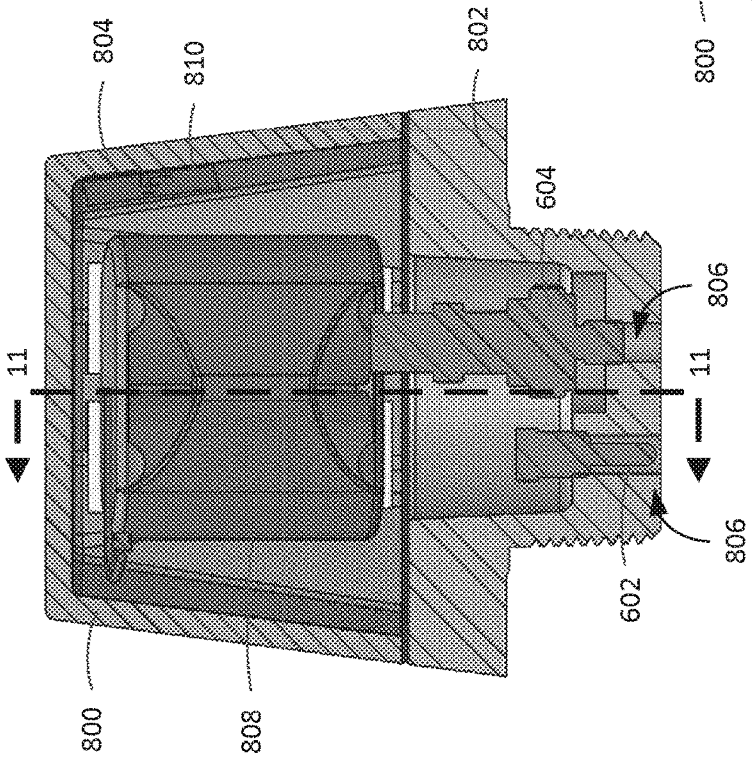
FIG. 10 is a cross-sectional view of the cap from the wet-barrel hydrant from FIG. 9.

In a further embodiment as shown in FIGS. 9-11, the temperature sensor 602 and pressure sensor 604 may be incorporated in a cap 800 of a wet-barrel hydrant 50. In FIGS. 10 and 11, the cap 800 can have a plug 802 connected to a canister 804 by one or more mechanical fasteners (not shown). In one embodiment, the mechanical fasteners can be screws or bolts, but other types of fasteners or fastening techniques can be used in other embodiments. A sealing device (e.g., a gasket) may be placed between the plug 802 and the canister 804 prior to connecting the plug 802 and canister 804 to provide a water-tight seal. The temperature sensor 602 and the pressure sensor 604 can be located in a cavity of the plug 802. Each of the temperature sensor 602 and the pressure sensor 604 can be partially located in a passageway 806 of the plug 802 such that the temperature sensor 602 and the pressure sensor 604 are in contact with the water in the barrel of the wet-barrel hydrant 50. In one embodiment, the temperature sensor 602 and the pressure sensor 604 can be mounted in appropriate housings or have appropriate seals to prevent water from entering the cavity of the plug 802 via the passageways 806.

In addition, the temperature sensor 602 and the pressure sensor 604 may be connected to the communication network device 122 by a wired connection (not shown). The wired connection can provide a communication path between the communication network device 122 and the temperature sensor 602 and the pressure sensor 604. The communication path provided by the wired connection can be used to communicate sensor signals, which may be analog or digital, from temperature sensor 602 and the pressure sensor 604 and to communicate data signals between communication network device 122 and the temperature sensor 602 and the pressure sensor 604. In an embodiment, the temperature sensor 602 and/or the pressure sensor 604 may process some or all of their measurements and communicate values determined therefrom to communication network device 122 via a data signal. The wired connection may also be used to provide power to the temperature sensor 602 and the pressure sensor 604 from a power supply 808. The wired connection may provide power directly from the power supply 808 to the temperature sensor 602 and the pressure sensor 604 or the power may be provided from the power supply 808 via the communication network device 122. The communication network device 122 may be connected to an antenna 810 to permit the communication network device 122 to communicate with the central monitoring system 12 or other hydrants 50.

As discussed above, each hydrant 50 can include numerous sensors such as pressure sensor 604 and temperature sensor 602. The sensors located in each hydrant 50 can be utilized as part of a characteristic monitoring system to monitor characteristics of the water of the water distribution system 1, including energy characteristics of the water distribution system 1. In one embodiment, the logic and memory for the characteristic monitoring system can be incorporated in the remote measurement device 120 and utilize the components of the remote measurement device 120 (e.g., processor 202 and memory 214). In another embodiment, the logic and memory for the characteristic monitoring system can be incorporated in the communication network device 122 and utilize the components of the communication network device 122 (e.g., processor 302 and memory 314). In still other embodiments, the characteristic monitoring system can utilize components from one or more of the remote measurement device 120, the communication network device 122 and/or the communication device 630 or the characteristic monitoring system can use dedicated components (e.g., sensors, processors and/or memory devices).

In an embodiment, the characteristic monitoring system can incorporate a pressure sensor 604 that is a "low power" and "fast response" pressure transducer (e.g., a MSST 10 series pressure transducer from Measurement Solutions LLC) that can perform high-speed sampling (e.g., 64 samples per second or faster) of the water pressure in the water distribution system 1 to detect compression or pressure pulses associated with the movement of energy through the water of the water distribution system 1. For example, a pressure pulse may be generated in the water distribution system 1 as a result of a valve in the water distribution system 1 being opened or closed too quickly, which opening or closing of the valve generates an onrush of water in the water distribution system 1. The detection of energy characteristics (e.g., a pressure pulse or reflections of a pressure pulse, also known as a water hammer) can be important because energy can move very quickly through a water distribution system 1 and can have the potential to cause considerable damage to the physical infrastructure of the water distribution system 1. Some types of damage that can be caused by energy travelling through the water distribution system 1 can include: weakening, separating and/or opening pipe joints; creating or expanding cracks and leaks; and causing pressure reduction valves in the water distribution system 1 to fail, resulting in significant secondary downstream effects and potential damage in the water distribution system 1.

The sample rate for the pressure sensor 604 can be the frequency at which the characteristic monitoring system converts the analog input waveform of the compression (or energy) pulse detected by the pressure sensor 604 into digital data. The characteristic monitoring system can be dynamically configured to sample at a variety of frequencies (which sampling frequencies can be limited by a combination of computing, sensor and battery performance constraints). In an embodiment, the characteristic monitoring system and pressure sensor 604 can be operated at a sampling rate (or frequency) of 256 samples per second. Consequently, the characteristic monitoring system can identify pressure pulses (in the water distribution system 1) that may be as short as 1/256 of a sample period or 3.9 milliseconds. In another embodiment, the characteristic monitoring system may require two back-to-back sample threshold excursions (e.g., deviations from a predefined threshold) to characterize a pressure pulse event, thus, the characteristic monitoring system can recognize an energy/compression event lasting as short as 7.8 milliseconds (3.9 milliseconds*2). In a further embodiment, the characteristic monitoring system and pressure sensor 604 can have a predetermined sample rate based on capturing samples at a predetermined interval between about 0.488 milliseconds (corresponding to about 2048 samples per second) and about 15.6 milliseconds (corresponding to about 64 samples per second).

In other embodiments, because the stability of both the characteristic being measured (e.g., energy pulses) and the measuring sensor itself (e.g., pressure sensor 604) may vary slightly, a "noise reduction" mechanism may be implemented to reduce the occurrence of "false positive" event declarations. Therefore, the characteristic monitoring system may require that a specific count of sequential measurement excursions, breaching the same measurement threshold, occur before a trigger condition is satisfied and an event is declared. While the specific count of sequential measurement excursions is a preselected variable in the characteristic monitoring system that can be established by a user, in one embodiment, the characteristic monitoring system can use a value of 5 sequentially breaching readings or excursions as the criterion to declare an event.

Figure 12:
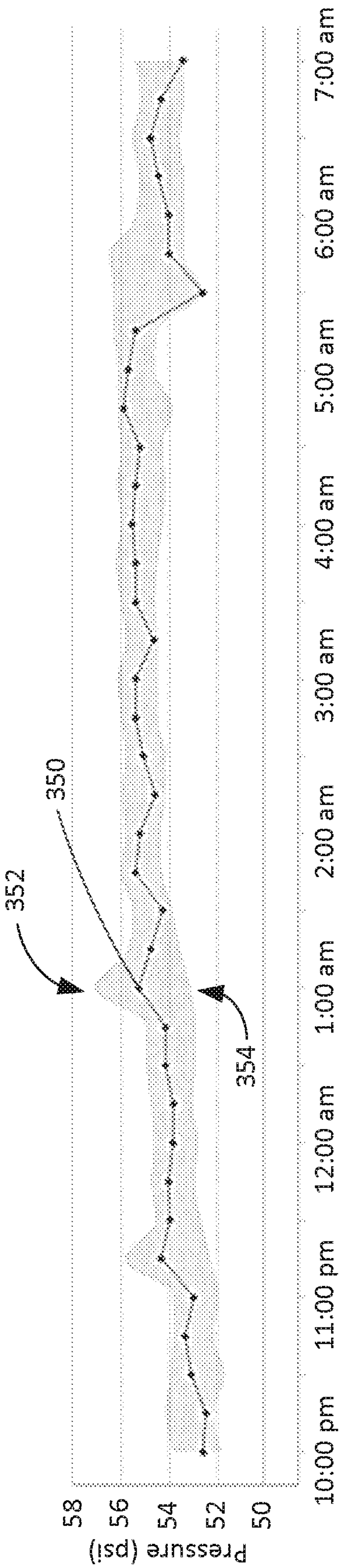
FIG. 12 is an embodiment of a graph showing the volatility of measured pressure values.

In an embodiment, the characteristic monitoring system monitors and saves sensor readings using two completely independent sample storage mechanisms: a first sample storage mechanism to store sample data only for the high-speed sampling sensors that are used to sense energy characteristics and a second sample storage mechanism to store sample data for the other characteristics. For the non-energy related characteristics, as each sample of each sensor is collected, the sample is processed according to "regular" sampling processes and saved in memory (e.g., Flash ROM) of the second sample storage mechanism on a periodicity defined as a variable in the characteristic monitoring system for regular sensor sampling. In one embodiment, regular sampling processes can include sequentially capturing multiple measurements or samples of a characteristic over a time period that includes the periodic measurement or sample of the characteristic. However, the sampling process can conflate the storage and/or display of the captured measurements such that the storage process saves, or the display process graphs, fewer measurements than were captured, but with additional contextual information to reveal insight into the non-displayed measurement data. For example, after capturing multiple measurements or samples of a characteristic over the time period, only the maximum value, the minimum value, the average value and/or the normal periodic value (i.e., the value captured at the defined periodicity) may be stored or displayed. As shown in FIG. 12, the periodic value graph is shown within a "data snake," which reveals the volatility of the measurement data during every period being reported by displaying both the high value 352 and the low value 354 measured during each period along with the periodic value 350 (i.e., the sample). The simultaneous graphing of the high values 352 and the low values 354 creates a snake-like image that includes (and must include, by definition) the periodic value 350 being graphed. The simultaneous graphing of both the periodic value and the extremes of variance measured for that characteristic during each time period greatly enhances the information conveyed in the combined graph. Several times each day, the characteristic monitoring system can upload the sensor data (from each of the sensors) in memory of the second sample storage mechanism to a back-end web-site database and/or the central monitoring system 12 for long-term storage.

The first sample storage mechanism for storing energy characteristics includes two separate and equally sized onboard processor-embedded-RAM buffers for storing the sample or measurement data relating to energy characteristics being captured. In one embodiment, the buffers can include 30 cells (with each cell corresponding to 1 second of measurement data) that can store data relating to 256 samples (when sampling at 256 samples per second). However, in other embodiments, the buffers may have more than 30 cells or fewer than 30 cells and each cell may store more or less than 256 samples. The one buffer can be for pre-event data (i.e., sample data captured before a triggering condition occurs) and the second buffer can be for post-event data (i.e., sample data captured after a triggering condition occurs). The two buffers are maintained as separate and distinct buffers (i.e., the one buffer is independent of the other buffer) and are managed differently with regard to the storage of sample data.

When capturing samples relating to energy characteristics, the monitoring system can operate and spend a majority of time in a pre-event capture mode (i.e., the monitoring system is waiting for an event or triggering condition to occur). While operating in the pre-event capture mode, the monitoring system can be continually capturing sample data and storing the sample data in the pre-event buffer at a frequency of 256 samples per second in one embodiment. In an embodiment, the pre-event buffer can be a circular memory buffer. A circular memory buffer configuration can be used for the pre-event buffer because the memory in the pre-event buffer is physically limited in total capacity. The circular memory buffer configuration for the pre-event buffer can use a circular buffer pointer mechanism to overwrite the oldest pre-event data with the newest pre-event data after the pre-event buffer has been filled with sample data. The circular buffer pointer mechanism can move to the next oldest data entry in the pre-event buffer after overwriting the oldest data in the pre-event buffer with new data. In an embodiment, once the pre-event buffer is full when operating in the pre-event capture mode, the pre-event buffer can always have the last 30 seconds of pre-event data (e.g., 256 samples/second*30 seconds=7,680 samples, if sampling at a sampling rate of 256 samples per second).

In addition, during operation, the monitoring system can periodically "phone home" (i.e., communicate with the central monitoring system 12 and/or back-end database) to upload sample data captured by the high-speed sampling sensor according to the "regular" sampling process (e.g., a sampling process having a longer periodicity (e.g., once every 5 minutes) over an extended period of time (e.g., hours) and stored in the second sample storage mechanism. In other words, the high-speed sampling sensor (e.g., a high-speed pressure sensor) can capture data for both the first sample storage mechanism (at the high-speed sampling rate) and the second sample storage mechanism (at the "regular" sampling rate). In an embodiment, the same pressure measurement from the high-speed pressure sensor can be stored in both the first sample storage mechanism and the second sample storage mechanism. After such "regular" sample data has been uploaded from the second sample storage mechanism, the pointers of the second sample storage mechanism can be reset to show that uploaded portion of the second sample storage mechanism is marked as now empty and eligible for the storing of additional new regular sample or measurement data.

Just before the pre-event measurement data is stored in the pre-event buffer, the measured value is compared to predefined upper and lower threshold values for that characteristic. If any characteristic threshold has been breached (i.e., any measured value has risen above its upper threshold, or any measured value has fallen below its lower threshold) for more than a predetermined variable count of sequential breaches (which variable count is selected to minimize noise), then a trigger condition is satisfied and an event is declared. In one embodiment, the predetermined variable count can be 5 consecutive breaches. However, in other embodiments, the predetermined variable count can be less than 5 consecutive breaches (e.g., 2 consecutive breaches) or can be 6 or more consecutive breaches.

The moment the characteristic monitoring system declares an event, the characteristic monitoring system switches into the post-event capture mode and stores the breaching set of measurement data as the initial entries of data into the post-event buffer. When the post-event capture mode is initiated, the pre-event buffer is locked or frozen in time, and cannot be updated or changed until the characteristic monitoring system reverts back to the pre-event capture mode. During operation in the post-event capture mode, the sample or measurement data from the high-speed pressure sensor is captured and stored in the post-event buffer until the post-event buffer is completely full, at which point the data in the post-event buffer is locked or frozen in time.

Once the post-event buffer is full, the monitoring system can announce that an event has happened to the central monitoring system 12 and upload the measurement data from the locked pre-event buffer and the post-event buffer to the back-end web-site database and/or the central monitoring system 12. During the upload process, the pre-event capture mode is suspended until the completion of the communications session to upload the pre-event and post-event data, after which time the pre-event capture mode can resume. In an embodiment, the regular periodic multiple sensor data capture and storage into the second sample storage mechanism of the non-energy characteristics of the water distribution system 1 can continue normally and independent of the pre- and post-event energy data capture and "phone home" (or upload) process. After the event data upload has been successfully completed, the characteristic monitoring system can reset the pointers for both the pre-event and post-event buffers to indicate that both allocations are now empty and return to the pre-event capture mode that places the captured sample data into the pre-event buffer. In another embodiment, a power reset control on the characteristic monitoring system can cause both pre-event and post-event buffer pointers to be reset to show their memory buffers as empty.

The characteristic monitoring system can confirm that the sample or measurement data from the high-speed sensor is within the predefined upper and lower threshold values indicating that conditions in the water distribution system 1 has returned to "normal" before starting to check for a new measurement threshold excursion. Typically, a short-term event (e.g., an event caused by a pressure pulse) can be concluded by the time the event data is uploaded to the central monitoring system 12. However, a long-term event (e.g., an event caused by a burst pipe in the water distribution system 1) may not be concluded by the time the event data is uploaded to the central monitoring system 12. In the context of a long-term event, a measurement value outside the predefined upper and lower threshold values in the pre-event buffer doesn't constitute a new event (to avoid having "new" events based on the same underlying condition that caused the original or first event) until the energy characteristic value is measured as having returned to be between the predefined upper and lower threshold limits. After the sample data has been determined to be within the predefined upper and lower threshold values, a new breaching or disturbance event can occur as previously described. Additional information regarding the operation and configuration of the characteristic monitoring system and the capturing and use of sample data from high-speed pressure sensors is described in more detail in U.S. patent application Ser. No. 17/988,546 entitled Remote Monitoring of Water Distribution System, which application is incorporated herein by reference.

In an embodiment, the central monitoring system 12 can incorporate an event localization architecture or system that processes the event data from the characteristic monitoring systems incorporated into hydrants 50 or elsewhere in the water distribution system 1 to be able to determine when a single disturbance event is detected by sensors in multiple locations and to provide information regarding the movement of the disturbance event through the water distribution system 1.

Figure 13:
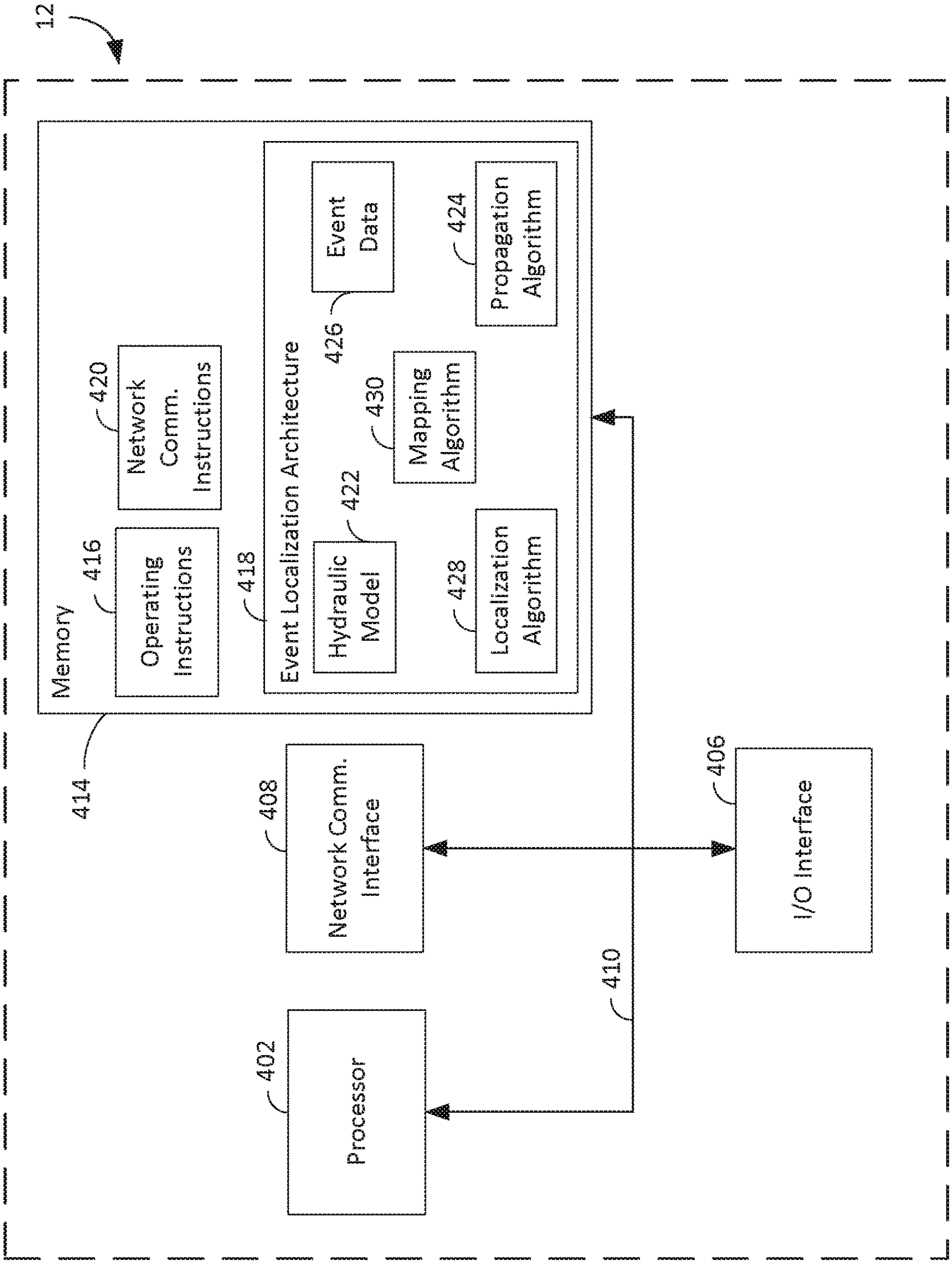
FIG. 13 is a block diagram of a central monitoring system in accordance with some embodiments of the present application.

FIG. 13 shows a central monitoring system 12 in accordance with some embodiments of the present application.

Although central monitoring system 12 may include any suitable components, in one embodiment, central monitoring system 12 may include a processor 402, an input/output (I/O) interface 406, a network communication interface 408, internal communication interface 410 and memory 414.

Processor 402 may control the operations of the other components of central monitoring system 12 and may include any suitable processor. A processor 402 may include any suitable processing device such as a general-purpose processor or microprocessor executing instructions from memory, hardware implementations of processing operations (e.g., hardware implementing instructions provided by a hardware description language), any other suitable processor, or any combination thereof. In one embodiment, processor 402 may be a microprocessor, a central processing unit (CPU) or a digital signal processor (DSP) that includes processing hardware to execute instructions stored in memory 414. Memory includes any suitable volatile or non-volatile memory capable of storing information (e.g., instructions and data for the operation and use of central monitoring system 12), such as RAM, ROM, EEPROM, flash, magnetic storage, hard drives, any other suitable memory, or any combination thereof. The processor 402 communicates with and drives the other elements within the central monitoring system 12 via an internal communication interface 410, which can include at least one bus.

The central monitoring system 12 can also include an input/output (I/O) interface 406 to receive inputs from a user of the central monitoring system 12 and to provide outputs to a user of the central monitoring system 12 as may be desired. A network communication interface 408 can be used to communicate with corresponding networks to enable communications between the central monitoring system 12 and the communication network devices 122 and hand-held user devices as may be desired. In one embodiment, the network communication interface 408 may provide for communications with the communication network devices 122, such as by using a cellular communication network or mesh communication network.

In one embodiment, memory 414 of central monitoring system 12 may include memory for executing instructions with processor 402, memory for storing data, and a plurality of sets of instructions to be executed by processor 402. Although memory 414 may include any suitable instructions, in one embodiment the instructions may include operating instructions 416 for generally controlling the operation of the central monitoring system 12, an event localization architecture or system 418 to identify and map disturbance events in the water distribution system 1, and network communication instructions 420 to facilitate communications with the communication network devices 122.

Network communication instructions 420 may include instructions for communicating with a communication network such as a cellular network and/or mesh network. In one embodiment, network communication instructions 420 may include instructions for communicating on a cellular network using an internet protocol data format or a SMS data format. Network communication instructions 420 may also include instructions for communicating using a mesh network (e.g., ZigBee). Network communication instructions 420 may also include instructions for encrypting and decrypting communications between central monitoring system 12 and the communication network, such that unauthorized third parties are unable to eavesdrop on such communications.

The event localization architecture 418 can also include logic 422, referred to herein as "a hydraulic model," logic 424, referred to herein as "a propagation algorithm," logic 428, referred to herein as "a localization algorithm," and logic 430, referred to herein as "a mapping algorithm." In other embodiments, the hydraulic model 422, the propagation algorithm 424, the localization algorithm 428 and/or the mapping algorithm 430 can be combined with the operating instructions 416 or with one another. The operating instructions 416, the network communication instructions 420, the hydraulic model 422, the propagation algorithm 424, the localization algorithm 428 and/or the mapping algorithm 430 can be implemented in software, hardware, firmware, or any combination thereof. In the central monitoring system 12 shown by FIG. 13, operating instructions 416, the network communication instructions 420, the hydraulic model 422, the propagation algorithm 424, the localization algorithm 428 and/or the mapping algorithm 430 can be implemented in software and stored in memory 414. When the operating instructions 416, the network communication instructions 420, the hydraulic model 422, the propagation algorithm 424, the localization algorithm 428 and/or the mapping algorithm 430 are implemented in software, the processor 402 may execute instructions of the operating instructions 416, the network communication instructions 420, the hydraulic model 422, the propagation algorithm 424, the localization algorithm 428 and/or the mapping algorithm 430 to perform the functions ascribed herein to the corresponding components. However, other configurations of the operating instructions 416, the network communication instructions 420, the hydraulic model 422, the propagation algorithm 424, the localization algorithm 428 and/or the mapping algorithm 430 are possible in other embodiments.

Note that the operating instructions 416, the network communication instructions 420, the hydraulic model 422, the propagation algorithm 424, the localization algorithm 428 and/or the mapping algorithm 430, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

Figure 14:
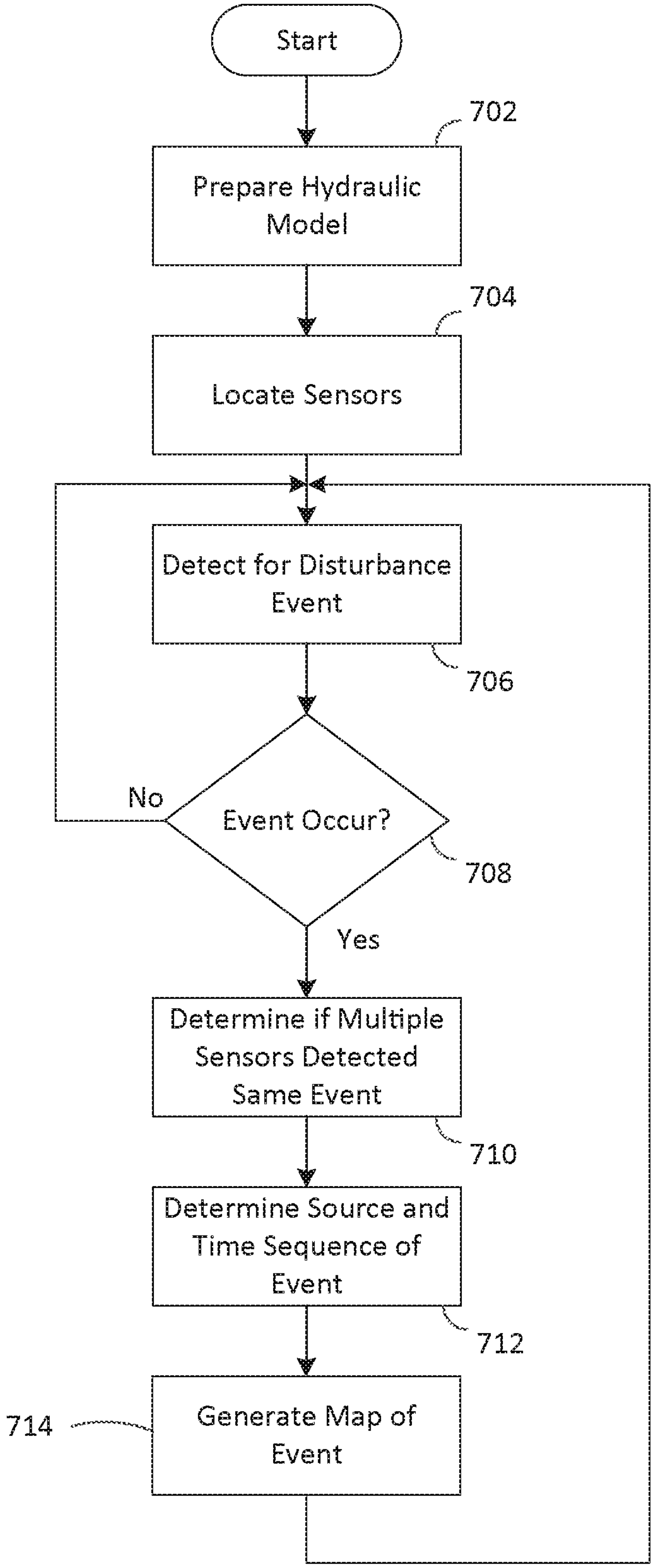
FIG. 14 is a flowchart of an embodiment of a process to perform event localization in a water distribution system.

The operation of the event localization system or architecture 418 will be described in more detail with respect to the process of FIG. 14. FIG. 14 shows an embodiment of a flowchart for a process to perform event localization in a water distribution system 1. Although a particular series of steps are depicted as being performed in a particular order in FIG. 14, it will be understood that one or more steps may be removed or added, and the order of the steps may be modified in any suitable manner.

The process begins with the preparation of a geophysical hydraulic data model 422 for the water distribution system 1 (step 702). The hydraulic model 422 provides a hydraulic topology of the water distribution system 1 and shows how all the components of the water distribution system 1 (e.g., valves, pumps, fire hydrants 50, etc.) are interconnected with corresponding piping (e.g., water main 14). In an embodiment, a mathematical graph theory approach can be applied to the hydraulic model 422, where fire hydrants 50, valves, pumps, piping intersections and certain other components or features of the water distribution system 1 are designated as nodes in the graph (e.g., nodes B, D, E and F from FIG. 1) and the pipes or piping of the water distribution system 1 are viewed as the links between the nodes (e.g., pipe between nodes D and E and pipe between nodes E and F shown in FIG. 1). The hydraulic model 422 can then be used to determine the time required for a disturbance event (e.g., a pressure pulse or other type of event) to travel from one point or node in the water distribution system 1 to another node in the water distribution system 1.

In an embodiment, the preparation of the hydraulic model 422 can include the data importation of one or more GIS (Geophysical Information System) data files into the event localization system 418. For example, three (3) GIS data files may be provided that provide information on hydrants, pipes and sources. The hydrants file can provide information on the locations of the fire hydrants 50 (i.e., some of the "nodes" in the graph). The pipes file can provide information on the material types, diameters, and lengths of the pipe segments of the water distribution system 1 (i.e., the "links" in the graph) and the locations of piping intersections (i.e., some additional "nodes" in the graph). The sources file can provide information on the locations in the water distribution system 1 that are expected to be sources of pressure disturbances (e.g., valves, pumps, etc.). The sources file may also include virtual nodes, such as locations along pipe segments (e.g., commercial service taps) from which disturbance events (e.g., pressure pulses) might be expected to originate. After the data files have been imported into the event localization system 418, a data correction step can be performed to correct any missing or incorrect information. For example, a pipe diameter of 0 for a pipe segment would be erroneous and need to be corrected. In addition, conversions between imperial measurements (e.g., inches, feet, etc.), and metric measurements (e.g., centimeters, meters, etc.) may need to be performed for proper operation of the event localization system 418.

A celerity time factor can then be determined for each of the links or pipe segments between nodes of the water distribution system 1. The celerity time factor can be the transit time (Time) required for the estimated speed (Velocity) of a disturbance event (e.g., the energy wave of a pressure pulse) to travel the link length (Distance), where Time=Distance/Velocity. Pipe characteristics, such as: the length of pipe segment, the inside pipe diameter, the pipe wall thickness, the pipe material composition, any known occlusions (e.g., corrosion) or deformations inside the pipe, and sedimentary bedding (e.g., sand, gravel, rocks) under and around the pipe can affect the determination of the celerity time factor for a link. In one embodiment, the hydraulic model 422 may include at least eight (8) different pipe materials (e.g., ductile iron, cast iron, PVC, reinforced concrete, etc.). The estimated Velocity for each link can depend on the aforementioned pipe characteristics, and possibly other known characteristics associated with water distribution networks. An accurate formulation or determination of the estimated Velocity, and therefore the transit time factor, for each link in the graph can be important for the event localization system 418. In an embodiment, once established in the hydraulic model 422, the transit time factor is fixed and doesn't change depending on subsequent event analyses. However, repeated analyses that may be off by a common amount of time may indicate or suggest that the estimated Velocity for that link in the graph may need to be re-calculated to correct for some previously unidentified factor or pipe characteristic, such as a partially crushed or corroded pipe, not originally included in the hydraulic model 422. In one embodiment, the calculation of estimated Velocity follows Hampson's (2014) formulation for pipe celerity (i.e., speed of sound or energy travelling in a pipe), as set forth in equation 1.

$$C = \sqrt{\frac{K/\rho}{1 + (K/E)(D/e)}} \tag{1}$$

where C is the speed of sound in the pipe in km/s, K is the bulk modulus of the fluid (i.e., water) in GPa, E is Young's modulus of elasticity for the pipe material in GPa, D is the inside diameter of the pipe, e is the pipe wall thickness, and ρ is the density of the fluid (i.e., water). C or celerity is the estimated Velocity in the T=D/V calculation for determining transit time per link between nodes.

Because disturbance events (e.g., pressure pulses) may travel along multiple pathways (i.e., different sequences of links) of the water distribution system 1 between the source of the event and any water monitoring sensor locations (e.g., characteristic monitoring systems) that detect the event, the same disturbance event may be detected at the same monitoring sensor location more than once, only at slightly different times and at different intensities (or amplitudes), depending on the pathways (or sequences of links) travelled by the event. For example, referring to FIG. 1, a disturbance event occurring at point A may be detected twice by the water monitoring sensor of hydrant 50 at point B. One detection may be from the disturbance event following a pathway indicated by C1 and the other detection may be from the disturbance event following a pathway indicated by C2. Thus, in order to be able to identify a single disturbance event across multiple sensors (or the same sensor multiple times), the hydraulic model 422 has to have accurate information regarding the specifications of pipes and other hydraulic assets along the pathways or links so that accurate transit times can be determined and then used to identify the disturbance event.

Once the shortest accumulated transit time link path between each pair of nodes is determined, the hydraulic model 422 can create a matrix with the minimum or fastest summed transit time required for a disturbance event (e.g., an energy wave/pressure transient) to traverse the shortest path links between any two nodes in the graph. For example, referring again to FIG. 1, node D may be connected to node E and node E may be connected to node F. While there is not a single link between nodes D and F, a minimum transit time link path can be determined for nodes D and F based on the transit times for the link between nodes D and E and the link between nodes E and F. In an embodiment, directionality may or may not be a factor in calculating the transit time between any two nodes, depending on the velocity of the water in any particular link (e.g., a link near a pump), relative to the velocity of the water characteristic being measured. For example, directionality may be more important for disturbance events that involve material transients because the material transients can move at the speed of the water. In contrast, disturbance events that involve energy transients move at the speed of energy through the medium of water and are not as impacted by the velocity of the water in the link. Thus, in one embodiment, different transit time matrices may be generated for different types of disturbance events. As an example, the transit time matrix for an energy transient disturbance event does not account for the direction of travel of the disturbance event (e.g., the transit time from node D to E is the same as the transit time from node E to D) and can be a half-matrix as shown in Table 1.

TABLE 1

| Transit Time (in milliseconds) | | | |
|---|---|---|---|
| Node | D | E | F |
| D | 0 | — | — |
| E | 257 | 0 | — |
| F | 562 | 305 | 0 |

However, the transit time matrix for a material transient disturbance event does account for the direction of travel of the disturbance event (e.g., the transit time from node D to E is different from the transit time from node E to D) and can be a full-matrix as shown in Table 2. If directionality is a factor, then the transit time matrix can designate a source node and a destination node as indicated in Table 2 when providing the transit time.

TABLE 2

| Transit Time (in milliseconds) | | | | |
|---|---|---|---|---|
| | | Source Node | | |
| | Node | D | E | F |
| Destination Node | D | 0 | 255 | 555 |
| | E | 257 | 0 | 300 |
| | F | 562 | 305 | 0 |

In another embodiment, the hydraulic model 422 can also incorporate information regarding changes (e.g., increases or decreases) in the intensity or amplitude of an energy transient disturbance event when travelling through a link or pipe segment of the hydraulic model 422. For example, a determination can be made that a particular pipe segment dampens the intensity (or lowers the amplitude) of energy transients passing through the pipe segment. The variability of the changes in intensity for pipe segments can result from the use of different materials (e.g., ductile iron pipes versus plastic pipes). The information regarding changes in intensity for individual pipe segments or links can be stored in the transit time matrix in one embodiment or can be stored in a separate matrix in other embodiments. Similar to the travel times in the transit time matrix, the changes in intensity can be combined to show changes in intensity over multiple links or pipe segments.

Referring back to FIG. 14, once the hydraulic model 422 for the D water distribution system 1 has been prepared, the location of water monitoring sensors (e.g., characteristic monitoring systems) can be determined (step 704). In one embodiment, if the water distribution system 1 already has numerous water monitoring sensors in place, then the current water monitoring sensors can be correlated to nodes in the hydraulic model 422. However, in other embodiments where there are only a few water monitoring sensors (or no water monitoring sensors) in the water distribution system 1, the propagation algorithm 424 of the event localization system 418 can be used to determine appropriate or recommended placements for water monitoring sensors in the water distribution system 1 (in addition to any water monitoring sensors that may already be in place). In one embodiment, the propagation algorithm 424 may use a Monte Carlo simulation computational algorithm or model to determine sensor placement. The Monte Carlo simulation can use randomness to predict the probability of a variety of outcomes (e.g., sensor placements) that might be deterministic in principle. However, in other embodiments, different simulation algorithms may be used to determine sensor placement.

The propagation algorithm 424 can execute multiple Monte Carlo simulations with varying or random input parameters. In one embodiment, the input parameters for the Monte Carlo simulation of the propagation algorithm 42 can include: a) a selection of the appropriate transit time matrix from the hydraulic model 422, which selection can be based on the disturbance event (e.g., energy transients vs. material transients) to be monitored or detected; b) a selection of a number of randomly chosen disturbance events (at different sources or source points) to simulate; and c) a selection of a number of sub-regions for the water distribution system 1, to ensure that each such sub-region has an optimal placement of sensor locations. Based on the selected input parameters, the Monte Carlo simulation can create artificial events that start at different possible source points (i.e., nodes or virtual nodes) in the water distribution system 1 and then use the pre-processed transit time matrix (and energy dampening (i.e., reductions in intensity) factors in some embodiments) to predict which nodes or fire hydrant locations would be most likely to detect the most future disturbance events in the water distribution system 1.

For each simulation that is executed, the propagation algorithm 424 can identify and report in declining order of priority the best fire hydrant locations or nodes for installation of water monitoring sensors to maximize the likelihood of recognizing and locating future disturbance events which may occur in each sub-region of the water distribution system 1. In one embodiment, multiple simulations can be executed when the objective is to compare results from simulations with different event source or region parameters. The output of the propagation algorithm 424 can show a descending priority list of recommended fire hydrant locations or nodes at which to install water monitoring sensors, where the highest priority ranking is determined by the lowest simulation error factors for each sub-region. As discussed above, the output of the propagation algorithm 424 can be used as a "sales tool" because the results from the multiple simulations can provide a helpful guide for a new customer as to how many water monitoring sensors should be purchased and where the water monitoring sensors should be installed in the water distribution system 1.

After the location of the water monitoring sensors is determined (and the water monitoring sensors are installed, if applicable), the water monitoring sensors (e.g., the characteristic monitoring systems) can begin detecting for a disturbance event (step 706) and report any disturbance event, as discussed above, to the central monitoring system 12. The event localization system 418 of the central monitoring system 12 can then identify that a disturbance event has occurred (step 708) based on the reporting from the water monitoring sensors. If no disturbance event is detected (i.e., the water monitoring sensors are just reporting regular monitoring operations), the process returns to step 706 and continues to await the reporting of a disturbance event. However, if a disturbance event is identified, the pre-event and post-event data from the water monitoring sensors can be stored in event data 426. Next, the event localization system 418 determines whether multiple sensors have reported the detection of the same disturbance event (step 710). In an embodiment, the event localization system 418 determines that the same disturbance event has occurred when a preselected number of sensors greater than one (e.g., three sensors) all report disturbance events to the central monitoring system 12 within a preselected time period (e.g., 30 seconds). In other embodiments, the preselected time period can be shorter than 30 seconds (e.g., 15 seconds) or longer than 30 seconds (e.g., 5 minutes).

Figure 15:
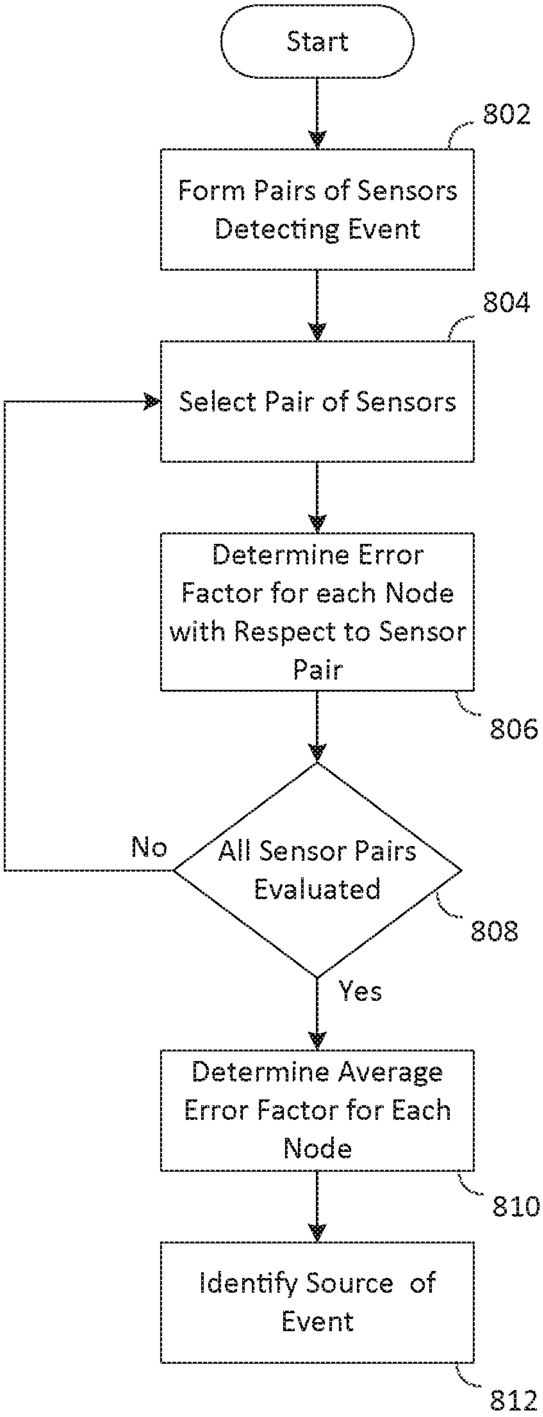
FIG. 15 is a flowchart of an embodiment of a process for determining the source of a disturbance event.

The event localization system 418 then determines a source and time sequence of the disturbance event after multiple sensors have detected the same disturbance event (step 712). In one embodiment, the event localization system 418 can determine the source of the disturbance event according to the process of FIG. 15. FIG. 15 shows an embodiment of a flowchart for a process for determining the source of a disturbance event from step 712 of FIG. 14. Although a particular series of steps are depicted as being performed in a particular order in FIG. 15, it will be understood that one or more steps may be removed or added, and the order of the steps may be modified in any suitable manner.

The process of FIG. 15 begins by forming pairs of water monitoring sensors that detected the disturbance event (step 802). For example, if 3 water monitoring sensors detected a disturbance event, then 3 pairs of sensors are formed and if 4 water monitoring sensors detected a disturbance event, then 6 pairs of sensors are formed. Next, one pair of water monitoring sensors is selected from the group of sensor pairs (step 804). For the selected pair of water monitoring sensors an error factor for each node of the water distribution system is determined (step 806).

In one embodiment, the error factor for each node can be determined by first calculating an "actual" time difference (ATD) between the selected pair of sensors detecting the disturbance event using event data 426. The ATD is the difference in the time stamps from when the first sensor (of the sensor pair) detected the disturbance event and when the second sensor (of the sensor pair) detected the disturbance event. Next, each node in the hydraulic model is then evaluated with respect to the selected sensor pair as a possible source location of the disturbance event. However, in some embodiments, only a select group of nodes in the hydraulic model may be evaluated as source nodes based on a determination that a certain set of nodes cannot be the source node for the disturbance event. For example, nodes may be determined to not be a source node for a disturbance event when the nodes are located in a non-adjacent sub-region of the water distribution system 1 to the water monitoring sensors detecting the disturbance event or the nodes have a preselected number of water monitoring sensors that did not detect the disturbance event located between the node and the water monitoring sensors that did detect the disturbance event. For each node being evaluated, an "expected" difference in transit times (ETD) from that node to each sensor of the sensor pair is calculated using the transit time matrix. The ETD is the difference between the expected time for a disturbance event to travel from the node to the first sensor (of the sensor pair) and the expected time for a disturbance event to travel from the node to the second sensor (of the sensor pair). An error factor (EF) is then calculated for the node as the difference between the ATD and the ETD. The process is then repeated until an EF is calculated for each node in the hydraulic model (or for the group of nodes being evaluated). In an embodiment, the EF information can be stored in a matrix or table with each sensor pair corresponding to a column of the matrix and each node corresponding to a row of the matrix.

After an error factor EF is determined for each of the nodes with respect to a sensor pair, a determination is made as to whether all sensor pairs have been evaluated (step 808). If not, a new sensor pair is selected in step 804 and an EF for each of the nodes is determined (with respect to the new sensor pair) in step 806. If all sensor pairs have been evaluated, an average EF is determined for each of the nodes (step 810). In an embodiment, the average EF for each node can be added as a new column to the matrix discussed above.

Once the average EF is calculated for each of the nodes, the source of the disturbance event can be identified (step 812). In one embodiment, the source of the disturbance event can be identified by sorting the rows of the matrix from smallest average EF to largest average EF (or vice versa). The node having the smallest average EF can be judged or identified to be (or be closest to) the most likely source of the disturbance event. In another embodiment, the average error factors can be applied to a probability distribution curve to determine the likelihood of the disturbance event having been triggered close to each of the nodes. An analysis of the probabilities can then be performed to help assess the certainty of a source determination when multiple nodes have average error factors that are in close proximity to the smallest average error factor. Referring back to step 712 of FIG. 14, once the source location of the disturbance event has been determined or identified, the time sequence or propagation of the disturbance event can then be determined based on the sensor readings from the water monitoring sensors. The time sequence of the disturbance event can reflect the time when the disturbance event reached a water monitoring sensor and/or the intensity of the disturbance event (e.g., the pressure measurement or the amount the pressure measurement is above the threshold).

As previously discussed, the localization algorithm 428 analyzes the water monitoring sensor measurements (i.e., the aforementioned pre-event and post-event data stored in event data 426) associated with the disturbance event in the context of the transit time matrix for the hydraulic model 422 of the water distribution system 1, to identify: a) when the same disturbance event was observed by multiple water monitoring sensors at different locations of the water distribution system 1 (step 710); and b) the source of the disturbance event (i.e., the corresponding or closest node) and the time sequencing of the disturbance event (step 712). In an embodiment, the localization algorithm 428 may use a Monte Carlo simulation computational algorithm or model. However, in other embodiments, different simulation algorithms may be used.

The localization algorithm 428 can execute multiple Monte Carlo simulations using the pre-event and post-event data stored in the event data 426 from multiple water monitoring sensors detecting the disturbance event and the information in the transit time matrix to identify the most likely node where the disturbance event occurred. In one embodiment, after the simulations have been executed, the localization algorithm 428 can identify and report a node corresponding to the source of the disturbance event and a propagation (or time sequence) of the disturbance event. In another embodiment, the output of the localization algorithm 428 can show a descending confidence or probability factor list of possible sources of the disturbance event.

It is noted that the same disturbance event may be detected by a water monitoring sensor multiple times in cases where multiple pathways connect the likely source of the disturbance event and the water monitoring sensor. Each of the pathways between the source of the disturbance event and the water monitoring sensor can incorporate a different sequence of connected links from the hydraulic model, such that the disturbance event has different accumulated transit times to travel down each of the different pathways from the source of the disturbance event to the water monitoring sensor. In addition, certain pathways may dampen the energy amplitude (or intensity) of the traveling disturbance event more or less than other pathways, which can result in different transit times for the disturbance event. Therefore, even though amplitude measurements can help indicate where a disturbance event originated (i.e., stronger amplitude can be closer to the source of the disturbance event than a weaker amplitude, since amplitude generally dissipates over distance traveled), amplitude cannot be solely used when determining the source of the disturbance event. Consequently, for backtracking events from water monitoring sensors (i.e., sensor nodes) to the likely source of the disturbance event (i.e., the source node) the localization algorithm 428 can sequence the disturbance event by the first event detection at each sensor node that detected the disturbance event. However, to recognize variances in amplitude, the mapping algorithm 430 can display the differences in amplitude measurement by using varying colors with symbolized balloons graphically shown at each sensor node detecting the disturbance event.

After the most likely source and time sequence for the disturbance event has been determined, an event map of the disturbance event can be generated (step 714) and the corresponding information for the disturbance event can be saved in memory 414 (e.g., event data 426) for subsequent use as historical data. The mapping algorithm 430 of the event localization system 418 can use the information from the localization algorithm 428 regarding the disturbance event and generate a visual display of the disturbance event for a user. In an embodiment, the mapping algorithm 430 can overlay the hydraulic topology (or graph) of the water distribution system on top of a geographic map to provide a "real world" reference for the disturbance event. The mapping algorithm 430 can then superimpose varying sizes of balloon shapes (or other suitable shapes) around the sensor locations (from the hydraulic topology) to visualize the geographic scope of the sensor locations from which the disturbance event was reported. In addition, the mapping algorithm 430 can provide a graduated color symbology within the balloons to visualize the intensity of the event at individual locations (based on the corresponding sensor readings at the locations) within the corresponding geography. In another embodiment, the graduated color symbology can display not only the intensity of the disturbance event identified, but also use color tinting to show the time sequencing as to when the disturbance event was detected at multiple water monitoring sensor locations (e.g., brighter hues of colors can be associated with the start of the disturbance event and change to duller hues of colors as time elapsed for the disturbance event). In another embodiment, the "data snake" graphical technique, with its high value and low value measurement tracking, can be used as a second level analytical tool to study the characteristic measurement values at other water monitoring sensors which failed to report a disturbance event while being in the same general vicinity of water monitoring sensors which did report a disturbance event. For example, the maximum values from the "data snake" for nearby water monitoring sensors (that did not indicate a disturbance event) may be used to evaluate the broader impact of the disturbance event by identifying water monitoring sensors that were probably affected by the disturbance event (i.e., had a maximum value near the threshold) but not actually impacted to the extent that a disturbance event was triggered.

Figure 16:
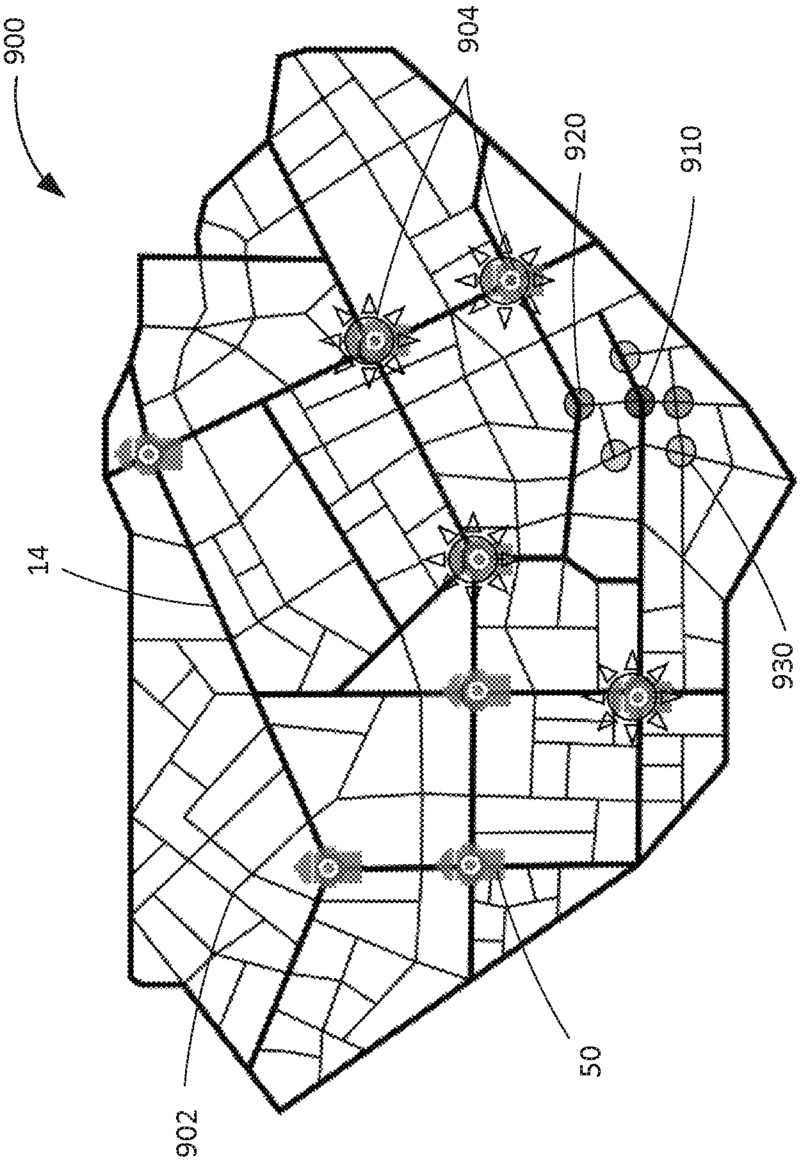
FIG. 16 is a schematic diagram of an embodiment of an event map showing disturbance event information.

FIG. 16 shows an embodiment of an event map with disturbance event information. The event map 900 shows a water distribution system 1 with main lines (or water mains) 14, secondary lines 902, and the location of hydrants 50. While not specifically shown in FIG. 16, the event map 900 may also indicate the locations of other components of the water distribution system 1 such as pumps or valves. In addition, the event map 900 can also indicate the location of water monitoring sensors, if the water monitoring sensors are not associated with a hydrant or other component displayed on the event map 900. After a disturbance event has been detected and analyzed, the event map 900 can display the locations of the water monitoring sensors indicating an alarm 904. In addition, the event map 900 can show the node 910 that was determined to be the most likely source of the disturbance event. In one embodiment, node 910 can be determined to be the node with the lowest error factor. As shown on the event map 900, the node 910 has a first shading to indicate that the node is the most likely source of the disturbance event. In addition, the event map 900 may also indicate other possible source nodes having different shadings based on the error factors for the nodes. Node 920 can have a second shading (different from the first shading) to indicate a possible source node that has a lower error factor (but not as low as the error factor for node 910). Similarly, node 930 has a third shading (different from the first and second shadings) to indicate a possible source node that has a low error factor (but not as low as the error factors for nodes 910 and 920).

In one embodiment, the event localization system 418 can begin collecting and evaluating disturbance event information from multiple sensors a preselected time period after the occurrence of an initial disturbance event (i.e., the first disturbance event reported to the central monitoring system 12). For example, the event localization system 418 may wait between 5 and 15 minutes before collecting and evaluating the disturbance event information to permit the water monitoring sensors to transmit disturbance event information to the central monitoring system. However, in other embodiments, the event localization system 418 can perform "real time" analysis of disturbance events. For example, when the event localization system 418 receives a disturbance event from a water monitoring sensor, the event localization system 418 can then begin looking for a subsequent disturbance event from another water monitoring sensor. After receiving a second disturbance event from a second water monitoring sensor, the event localization system 418 can begin determining if the disturbance events are related as described above. The event localization system 418 can continuously expand the scope of the analysis of the disturbance events for as long as disturbance events are being reported by the water monitoring sensors (including water monitoring sensors that may have previously reported an event). The event localization system 418 can conclude the analysis of the disturbance event and provide information on the disturbance event (as described above) after a preselected time period has elapsed without the event localization system 418 receiving a report of a new disturbance event from a water monitoring sensor.

In an embodiment, the event localization system 418 can identify and evaluate several characteristics when determining if multiple disturbance events reported by the water monitoring sensors are, in fact, a result of the same disturbance event. As part of the analysis, the event localization system 418 can determine where (geographically) a disturbance event was observed by water monitoring sensors and how broadly the disturbance event was observed across multiple water monitoring sensor locations. In addition, the event localization system 418 can determine the duration of the disturbance event at any one sensor and/or across multiple sensor locations and determine the progression path of the disturbance event from one monitoring location to another location over time. Finally, the event localization system 418 can determine the speed of progression of the disturbance event from one monitoring location to another location over time and the varying intensity of the disturbance event at different monitoring sensor locations at those different times.

In another embodiment, the event localization system 418 can perform an analysis to identify common error factors over multiple simulations by the localization algorithm 428 to determine where one or more entries in the transit time matrix don't reflect the reality experienced in the actual pre-event and post-event data in the event data 426, such that certain entries in the transit time matrix must be modified/updated to reduce their error contributions to future simulations and better reflect real-world conditions. The erroneous entries in the transit time matrix can be caused by erroneous pipe parameters or by pipe segment damage which is changing the celerity of that pipe segment. In addition, the event localization system 418 can perform a correlation analysis between hydraulic modeling pipe segment/link properties (e.g., pipe material, pipe diameter, etc.) and the pre-event and post-event data stored in the event data 426 to determine how particular pipe properties may impact changes in intensity as determined by the localization algorithm 428 and the mapping algorithm 430.

As mentioned previously, the transit time matrix can define the expected time for a disturbance event to travel from one node (e.g., the source node) in the water distribution system 1 to another node (e.g., a sensor node) via a sequence of pipe links (sometimes referred to as a pathway). The expected time for the disturbance event to travel between the nodes can be based on piping parameters and/or specifications for each link in the sequence or pathway. As also mentioned previously, incorrect piping parameters and/or specifications or damage (known or unknown) to the pipe in one or more of the links may cause the expected time determination between nodes to consistently differ from real-world measurements between the same nodes. In an embodiment, the event localization system 418 can identify consistent differences between expected and actual transit times over an extended number of disturbance events such that the event localization system 418 can adjust the expected transit times in the transit time matrix to better reflect the real world measurements. The event localization system 418 can then both: a) reduce the error factors (between expected times and real-world measurements) and the consequent location uncertainty on future event localizations; and b) identify pipe links where possible damage may have occurred for future field study and investigation.

As previously mentioned, the event localization system 418 can implement a common error factor analysis algorithm where the outputs of multiple event localization algorithm simulations from prior disturbance events are saved and compared. For each same disturbance event localization, only the lowest error factor pathway (from the likely source node) plus a limited number (3 in one embodiment) of additional lower error factor pathways (from possible source nodes) for each disturbance event localization are included in the multiple historical event comparison. For each pathway of an event localization, the sequence of pathway links from the source node to the sensor node are listed as a set of links. The multiple pathway link sets from the multiple event localizations are correlated to find common subsets of links which appear in multiple event-pathway link sets. The common error factor analysis algorithm can be based on the assumption that the difference to be studied between expected and actual transit times is most likely to be found in the common subset of links. To perform the common error factor analysis, a minimum count (3 in one embodiment) of event-pathway link sets having the same shared common subset of links is needed. Furthermore, since there's no way to determine which link in the common subset of links may be the primary cause of the difference, the difference can be evenly divided across all links in the subset. Initially, the overall lowest event-pathway error factor from the multiple historical event comparison is evenly divided across all links in the subset and those link transit times are adjusted (usually) higher or (rarely) lower as indicated by whichever of the event-pathway's expected or actual times was lower. Then, all the historical event comparison pathway error factors are recalculated, and a collective optimization approach is used to minimize overall error factors. The adjustment and recalculation process is repeated until the overall error factors have been optimized and those resulting link time adjustments are made to the transit time matrix for future event localization simulations.

The foregoing is merely illustrative of the principles of this application and various modifications may be made by those skilled in the art without departing from the scope of this application. The embodiments described herein are provided for purposes of illustration and not of limitation. Thus, this application is not limited to the explicitly disclosed systems, devices, apparatuses, components, and methods, and instead includes variations to and modifications thereof, which are within the spirit of the attached claims.

The systems, devices, apparatuses, components, and methods described herein may be modified or varied to optimize the systems, devices, apparatuses, components, and methods. Moreover, it will be understood that the systems, devices, apparatuses, components, and methods may have many applications such as monitoring of liquids other than water. The disclosed subject matter should not be limited to any single embodiment described herein, but rather should be construed according to the attached claims.

What is claimed is:

1. A method for identifying and sequencing a disturbance event in a water distribution system, the method comprising:

generating a hydraulic model of the water distribution system, wherein the hydraulic model has a plurality of nodes and a plurality of links between nodes, wherein each node of the plurality of nodes corresponds to a component of the water distribution system and each link of the plurality of links corresponds to piping in the water distribution system between two components;

preparing a matrix for the plurality of nodes that stores information regarding a time for a disturbance event to travel between any two nodes of the plurality of nodes;

receiving measurements of water pressure in the water distribution system from a plurality of sensors, each sensor of the plurality of sensors being located at a node of the plurality of nodes, and wherein the plurality of sensors is less than the plurality of nodes;

detecting a plurality of disturbance events in the water distribution system using the received water pressure measurements, wherein a disturbance event is detected upon a measured water pressure breaching an upper or lower pressure threshold;

determining whether the detected plurality of disturbance events are related as a single disturbance event by analyzing data from the detected plurality of disturbance events;

identifying a source of the single disturbance event in the water distribution system using the analysis of the data from the detected plurality of disturbance events and time information relating to the plurality of nodes stored in the matrix, wherein the source of the single disturbance event corresponds to a node of the plurality of nodes; and presenting information about the single disturbance event to a user, wherein the presented information includes a location of the source of the single disturbance event in the water distribution system.

2. The method of claim 1, wherein the disturbance event is a pressure pulse.

3. The method of claim 1, wherein determining whether the detected plurality of disturbance events are related as a single disturbance event includes determining whether the plurality of disturbance events occurred within a preselected time period.

4. The method of claim 3, wherein the preselected time period is 30 seconds.

5. The method of claim 3, wherein detecting the plurality of disturbance events includes detecting disturbance events at 3 or more nodes of the plurality of nodes.

6. The method of claim 1, wherein presenting information about the single disturbance event include generating an event map, wherein the event map includes at least a portion of the plurality of nodes and at least a portion of the plurality of links interconnecting the corresponding nodes and the source of the single disturbance event is indicated on the event map with a balloon at the corresponding node of the plurality of nodes.

7. The method of claim 6, wherein the event map includes a plurality of balloons at a plurality of nodes detecting the plurality of disturbance events, wherein the plurality of balloons have a graduated color symbology to indicate different intensities of the disturbance event at different nodes.

8. The method of claim 6, wherein the event map includes a plurality of balloons at a plurality of nodes detecting the plurality of disturbance events, wherein the plurality of balloons have a different color tinting to indicate different times for the disturbance event at different nodes.

9. The method of claim 1, further comprises determining a plurality of locations in the water distribution system to receive a sensor configured to detect for a disturbance event, wherein the plurality of locations are optimized by a propagation algorithm.

10. The method of claim 9, wherein determining the plurality of locations includes dividing the water distribution system into a plurality of sub-regions and determining for each sub-region a plurality of locations in the sub-region to receive a sensor configured to detect for a disturbance event, wherein the plurality of locations in the sub-region are optimized by the propagation algorithm.

11. The method of claim 1, further comprises storing information about prior single disturbance events in memory to form historical event data and comparing the stored information about prior single disturbance events with information about the single disturbance event to make an evaluation about the single disturbance event.

12. The method of claim 11, where the evaluation about the single disturbance event is at least one of damage to the water distribution system from the single disturbance event or a cause of the single disturbance event.

13. The method of claim 12, further comprises adding the evaluation about the single disturbance event to the historical event data.

14. The method of claim 1, wherein presenting information about the single disturbance event to a user includes providing at least one characteristic of the single disturbance event.

15. The method of claim 14, wherein the at least one characteristic of the single disturbance event includes one or more of an amplitude of the disturbance event detected by each sensor of the plurality of sensors, a velocity of the disturbance event detected by each sensor of the plurality of sensors, a duration of the single disturbance event, a progression of the single disturbance event from the source of the single disturbance event or a dissipation of the single disturbance event from the source of the single disturbance event.

16. The method of claim 1, further comprises:

receiving information on a volatility of measurement data from one or more sensors that did not detect a disturbance event, wherein the one or more sensors that did not detect a disturbance event are located in proximity to the source of the single disturbance event; and performing an additional analysis of the single disturbance event with the received information on the volatility of measurement data from the one or more sensors that did not detect a disturbance event.

17. The method of claim 1, further comprises identifying one or more errors in the matrix for the plurality of nodes with information regarding a time for a disturbance event to travel between any two nodes of the plurality of nodes.

18. The method of claim 17, further comprises:

storing information about prior single disturbance events in memory to form historical event data; and implementing an error factor analysis on the historical event data to correct the one or more errors in the matrix for the plurality of nodes with information regarding a time for a disturbance event to travel between any two nodes of the plurality of nodes.

19. The method of claim 17, further comprises:

storing information about prior single disturbance events in memory to form historical event data; and implementing an error factor analysis on the historical event data to identify one or more links of the water distribution system that has experienced damage.

20. A system to identify and sequence a disturbance event in a water distribution system, the system comprising:

a plurality of sensors located throughout a water distribution system; and a central monitoring system in communication with each sensor of the plurality of sensors, the central monitoring system comprising:

a memory device storing an event localization architecture;

a processor connected to the memory device, wherein the processor is configured to execute instructions of the event localization architecture that cause the processor to:

generate a hydraulic model of the water distribution system, wherein the hydraulic model has a plurality of nodes and a plurality of links between nodes, wherein each node of the plurality of nodes corresponds to a component of the water distribution system and each link of the plurality of links corresponds to piping in the water distribution system between two components;

prepare a matrix for the plurality of nodes that stores information regarding a time for a disturbance event to travel between any two nodes of the plurality of nodes;

receive measurements of water pressure in the water distribution system and information regarding disturbance event detections from the plurality of sensors, wherein a disturbance event is detected upon a measured water pressure breaching an upper or lower pressure threshold, and each sensor of the plurality of sensors being located at a node of the plurality of nodes, and the plurality of sensors being less than the plurality of nodes;

determine whether the disturbance event detections are related as a single disturbance event by analyzing the received water pressure measurements and information regarding disturbance event detections from the plurality of sensors;

identify a source of the single disturbance event in the water distribution system using the analysis of the received water pressure measurements and information regarding disturbance event detections from the plurality of sensors and time information relating to the plurality of nodes stored in the matrix, wherein the source of the single disturbance event corresponds to a node of the plurality of nodes; and present information about the single disturbance event to a user, wherein the presented information includes a location of the source of the single disturbance event in the water distribution system.

* * * * *